(12) United States Patent
Liao et al.

(10) Patent No.: US 12,002,485 B2
(45) Date of Patent: Jun. 4, 2024

(54) INFORMATION PROCESSING DEVICE AND INFORMATION PROCESSING METHOD

(71) Applicant: SONY GROUP CORPORATION, Tokyo (JP)

(72) Inventors: Weihsiang Liao, Tokyo (JP); Keiichi Osako, Tokyo (JP); Yuhki Mitsufuji, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 364 days.

(21) Appl. No.: 17/310,433

(22) PCT Filed: Jan. 29, 2020

(86) PCT No.: PCT/JP2020/003080
§ 371 (c)(1),
(2) Date: Aug. 2, 2021

(87) PCT Pub. No.: WO2020/166324
PCT Pub. Date: Aug. 20, 2020

(65) Prior Publication Data
US 2022/0208212 A1 Jun. 30, 2022

(30) Foreign Application Priority Data
Feb. 12, 2019 (JP) ................................ 2019-022615

(51) Int. Cl.
*G10L 21/14* (2013.01)
*G06F 1/08* (2006.01)

(52) U.S. Cl.
CPC ............. *G10L 21/14* (2013.01); *G06F 1/08* (2013.01)

(58) Field of Classification Search
CPC ............ G10L 21/14; G06F 1/08; G06F 3/165
See application file for complete search history.

(56) References Cited

U.S. PATENT DOCUMENTS 8,620,672 B2 * 12/2013 Visser .................... H04R 3/005
704/226
10,409,552 B1 * 9/2019 Jara ......................... G10L 15/22
(Continued)

FOREIGN PATENT DOCUMENTS

CN 102088556 A 6/2011
JP 2004-251751 A 9/2004
(Continued)

OTHER PUBLICATIONS

International Search Report and Written Opinion of PCT Application No. PCT/JP2020/003080, dated Mar. 31, 20120, 10 pages of ISRWO.

*Primary Examiner* — Fan S Tsang
*Assistant Examiner* — David Siegel
(74) *Attorney, Agent, or Firm* — CHIP LAW GROUP

(57) ABSTRACT

The present technology relates to an information processing device, an information processing method, and a program that enable easier visualization of a sound field.
The information processing device includes: a calculation unit configured to calculate, on the basis of positional information indicating a plurality of observation positions in a space and an audio signal of sound observed at each of the plurality of observation positions, an amplitude or phase of the sound at each of a plurality of positions in the space at a first time interval; an event detection unit configured to detect an event; and an adjustment unit configured to perform, in a case where the event is detected, control such that the amplitude or the phase is calculated at a second time interval shorter than the first time interval. The present technology can be applied to a sound-field visualization system.

14 Claims, 10 Drawing Sheets

(56) References Cited

U.S. PATENT DOCUMENTS

2010/0260353 A1* 10/2010 Ozawa ................... H04R 3/04
381/94.3
2016/0171965 A1 6/2016 Arai et al.

FOREIGN PATENT DOCUMENTS

| | | | | |
|---|---|---|---|---|
| JP | 2005-241348 | A | 9/2005 | |
| JP | 2009-257944 | A | 11/2009 | |
| JP | 2010-210277 | A | 9/2010 | |
| JP | 2011-114801 | A | 6/2011 | |
| JP | 2014-137323 | A | 7/2014 | |
| JP | 2016-114512 | A | 6/2016 | |
| JP | 2017-203931 | A | 11/2017 | |
| WO | WO-0188905 | A1 * | 11/2001 | ............. G10L 21/06 |

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/003080 filed on Jan. 29, 2020, which claims priority benefit of Japanese Patent Application No. JP 2019-022615 filed in the Japan Patent Office on Feb. 12, 2019. Each of the above-referenced applications is hereby incorporated herein by reference in its entirety.

TECHNICAL FIELD

The present technology relates to an information processing device, an information processing method, and a program, and relates particularly to an information processing device, an information processing method, and a program that enable easier visualization of a sound field.

BACKGROUND ART

In recent years, technology regarding sound field control, such as wave field synthesis or immersive audio, has been generalized. Control of a virtual sound source or sound field by use of such technology enables acquisition of a sense of immersion more overwhelming than that in typical stereo audio or multichannel audio.

However, it is not easy to verify the accuracy or quality of an actually formed sound field. This is because evaluation based on human auditory perception is insufficient in reliability, for example, owing to unstable evaluation of a sense of localization or an error in localization in front and behind. Thus, it is important to evaluate the accuracy or quality of a sound field, objectively.

In order to evaluate the accuracy or quality of a sound field, objectively, measurement and visualization of an actually formed sound field is effective.

As a technology regarding visualization of a sound field, for example, proposed has been a sound-field visualization measurement device that includes a laser-light generation device, a lens, a beam splitter, and a photo-detection device in combination, and visualizes and measures the density of a sound field with variation in the difference between light and shade of interfering light along with variation in the density of the sound field (e.g., refer to Patent Document 1).

Furthermore, for example, proposed has been a sound-source search system that includes an image capturing device that captures a search target space, a microphone array, and a marker, estimates the position of each microphone in the microphone array, and computes the position of a sound source from sound pressure data observed at the position of each microphone (e.g., refer to Patent Document 2). According to the technology, moreover, a display device displays a visualized image of the position of the sound source acquired from the computation and a captured image of the search target space, in superimposition.

CITATION LIST

Patent Document

Patent Document 1: Japanese Patent Application Laid-Open No. 2005-241348

Patent Document 2: Japanese Patent Application Laid-Open No. 2009-257944

SUMMARY OF THE INVENTION

Problems to be Solved by the Invention

However, according to the technologies described above, it is not easy to visualize a sound field without dependence on uses and environments.

For example, according to the technology disclosed in Patent Document 1, use of the laser-light generation device and the photo-detection device that are typically not easily available is required, resulting in being limited to specific uses or environments.

Furthermore, according to the technology disclosed in Patent Document 1, for accurate measurement of a sound field, at the time of emission and reception of laser light, attention is required to prevent the laser light from interfering with light from another light source or noise different from an observation target, resulting in limitation in usage environment.

Moreover, according to the technology disclosed in Patent Document 2, the position of the sound source is acquired on the basis of the phase difference between sounds that reach the plurality of microphones (sound-source localization information). Thus, the position of the sound source corresponds to a sound pressure histogram in direction when viewed from each microphone.

Therefore, according to the technology disclosed in Patent Document 2, actually, the wavefronts of sound that passes through the spot at which each microphone is disposed are not displayed, and thus it is difficult to acquire information, such as the phase of sound, accurately.

The present technology has been made in consideration of such situations, and an object of the present technology is to enable easier visualization of a sound field.

Solutions to Problems

An information processing device according to one aspect of the present technology, includes: a calculation unit configured to calculate, on the basis of positional information indicating a plurality of observation positions in a space and an audio signal of sound observed at each of the plurality of observation positions, an amplitude or phase of the sound at each of a plurality of positions in the space at a first time interval; an event detection unit configured to detect an event; and an adjustment unit configured to perform, in a case where the event is detected, control such that the amplitude or the phase is calculated at a second time interval shorter than the first time interval.

An information processing method according to one aspect of the present technology or a program according to one aspect of the present technology, includes: calculating, on the basis of positional information indicating a plurality of observation positions in a space and an audio signal of sound observed at each of the plurality of observation positions, an amplitude or phase of the sound at each of a plurality of positions in the space at a first time interval; detecting an event; and performing, in a case where the event is detected, control such that the amplitude or the phase is calculated at a second time interval shorter than the first time interval.

In one aspect of the present technology, on the basis of positional information indicating a plurality of observation positions in a space and an audio signal of sound observed at each of the plurality of observation positions, an amplitude or phase of the sound at each of a plurality of positions in the space is calculated at a first time interval, an event is detected, and, in a case where the event is detected, control is performed such that the amplitude or the phase is calculated at a second time interval shorter than the first time interval.

MODE FOR CARRYING OUT THE INVENTION

Figure 1:
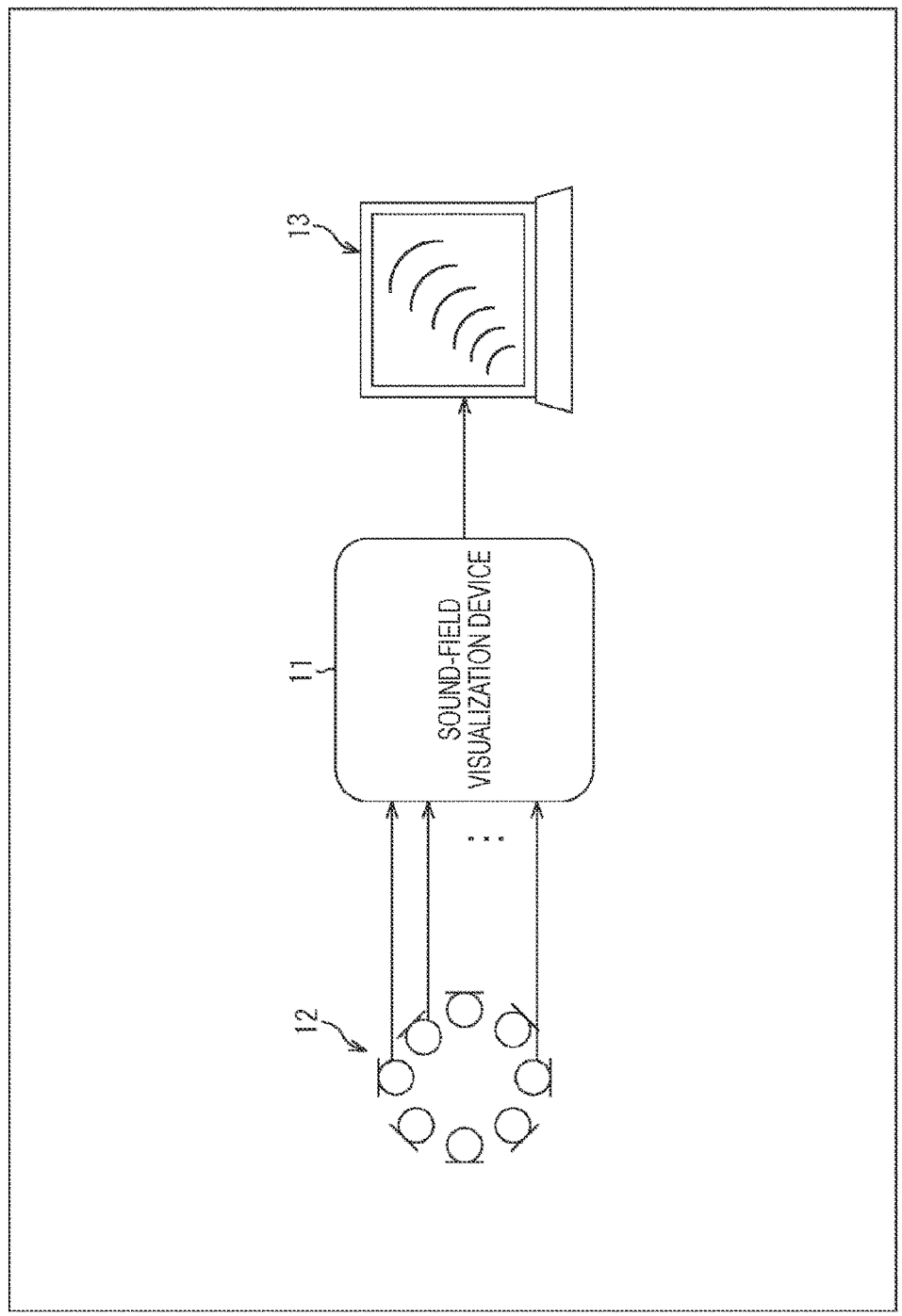
FIG. 1 illustrates an exemplary configuration of a sound-field visualization system.

An embodiment to which the present technology is applied will be described below with reference to the drawings.

First Embodiment

<Present Technology>

The present technology relates to a technique of visualizing the wavefronts of sound (sound field) formed in a space, namely, the distribution of sound pressure in the space, more easily.

According to the present technology, the wavefronts of sound in a space are rendered with audio signals of observed sounds and information regarding the observation positions of the audio signals, namely, positional information regarding microphones having performed sound pickup. The present technology as above can be used, for example, for real-time applications.

Furthermore, the present technology can be achieved with a microphone, an audio interface, a personal computer, and the like that are easily available, without any specific apparatuses.

Moreover, the present technology has the following features.

That is, according to the present technology, the distribution of sound pressure of sound in a space is calculated by calculation of a coefficient in mode domain (spatial frequency domain) for an audio signal of sound observed by a microphone, namely, a harmonic coefficient, such as a cylindrical harmonic coefficient or a spherical harmonic coefficient.

Use of the harmonic coefficient enables calculation of the sound pressure at an arbitrary position in the space, including any position at which no microphone is installed. Such calculation of the sound pressure corresponds to calculation of the wavefronts of physical sound propagating actually, with the harmonic coefficient, differently from simple interpolation in sound pressure between observation positions of sound. Note that exemplary calculation of the distribution of sound pressure, based on a harmonic coefficient, will be described herein. Alternatively, the distribution of sound pressure may be acquired, for example, by sparse coding or compressed sensing. For example, in sparse coding or compressed sensing, the distribution of sound pressure is calculated from a signal in spatial frequency domain.

Furthermore, for example, because sound propagates at a speed of approximately 340 m/sec, it is difficult to display the wavefronts of sound observed (distribution of sound pressure) without any change. That is, even if the display of the wavefronts of sound is updated in accordance with the propagation speed of sound, it is difficult for a user viewing the display thereof to instantaneously properly grasp, for example, the distribution of sound pressure in the space.

Therefore, according to the present technology, the temporal axis of rendering of the distribution of sound pressure, namely, the temporal axis of rendering of the condition of wavefronts of sound in a space is dynamically scaled, so that the condition of wavefronts of sound at a necessary timing can be observed in detail.

Moreover, according to the present technology, the wavefronts of sound can be rendered in a single frequency range or a wide frequency range acquired by merging a plurality of arbitrary frequency ranges together, in a sound field as an observation target. Furthermore, according to the present technology, wavefronts (distribution of sound pressure) can be rendered simultaneously in a plurality of frequency ranges differing mutually.

The present technology as above has the following advantages, in comparison to typical wavefronts display techniques.

That is, according to the present technology, acquisition of a harmonic coefficient by calculation and calculation of the distribution of sound pressure, based on the acquired harmonic coefficient, enable visualization of an accurate sound pressure of sound at an arbitrary position, namely, visualization of the amplitude and phase of sound.

Furthermore, scaling of the temporal axis at the time of rendering of the wavefronts of sound enables visualization of an instantaneous change of sound. According to the present technology, the amplitude or phase of sound can be visualized, differently from typical wavefronts display techniques based on sound-source localization. Thus, slow display due to scaling of the temporal axis has a great advantage.

In addition, according to the present technology, the wavefronts of sound can be visualized easily with a commercially available microphone, without any expensive and specific devices, such as a laser-light generation device and a photo-detection device, resulting in no limitation in usage environment or uses.

Moreover, unlike display of a distant distribution of sound pressure due to a technique with beamforming, according to the present technology, because the sound at the position at which a microphone is installed is acquired, the actual wavefronts of sound in the place (sound pressure) can be rendered.

Therefore, for example, a calculated distribution of sound pressure can be superimposed on content in an augmented reality (AR) system or in a virtual reality (VR) system or can be used as sound information, enabling various applications.

Exemplary Configuration of Sound-Field Visualization System

Next, an exemplary sound-field visualization system to which the present technology described above is applied will be described more specifically.

FIG. 1 illustrates an exemplary configuration according to an embodiment of the sound-field visualization system to which the present technology is applied.

The sound-field visualization system illustrated in FIG. 1 includes a sound-field visualization device 11, a microphone array 12, and a display device 13.

In the example, in the sound-field visualization system, a sound field formed in a visualization-target space (hereinafter, also referred to as a target space) is visualized on the display device 13.

That is, in the example, the microphone array 12, such as an annular microphone array or a spherical microphone array, having a plurality of microphones side by side, is disposed in the target space. The microphone array 12 collects the sound field formed in the target space by picking up ambient sound, and supplies its resultant multichannel audio signal to the sound-field visualization device 11.

The sound-field visualization device 11 serves as an information processing device that receives, as an input, the audio signal acquired by the sound pickup of the microphone array 12 and outputs an image for display indicating the wavefronts of sound (sound field) formed in the target space, more particularly, image data (picture data) of the image for display.

The sound-field visualization device 11 generates the image for display on the basis of the audio signal supplied from the microphone array 12 and supplies the acquired image for display to the display device 13.

Note that, although the image for display may be a still image or may be a moving image, the image for display is defined as a moving image in the following description.

The display device 13 displays the image for display supplied from the sound-field visualization device 11, to visualize the sound field in the target space.

Note that, herein, given will be an example in which, for observation of sound at a plurality of positions (observation positions) in the target space, the microphone array 12 including microphones disposed at the plurality of positions is used. However, a plurality of microphones may be used instead of the microphone array 12 as long as positional information indicating each observation position, namely, the arrangement position of each microphone can be acquired.

Exemplary Configuration of Sound-Field Visualization Device

Figure 2:
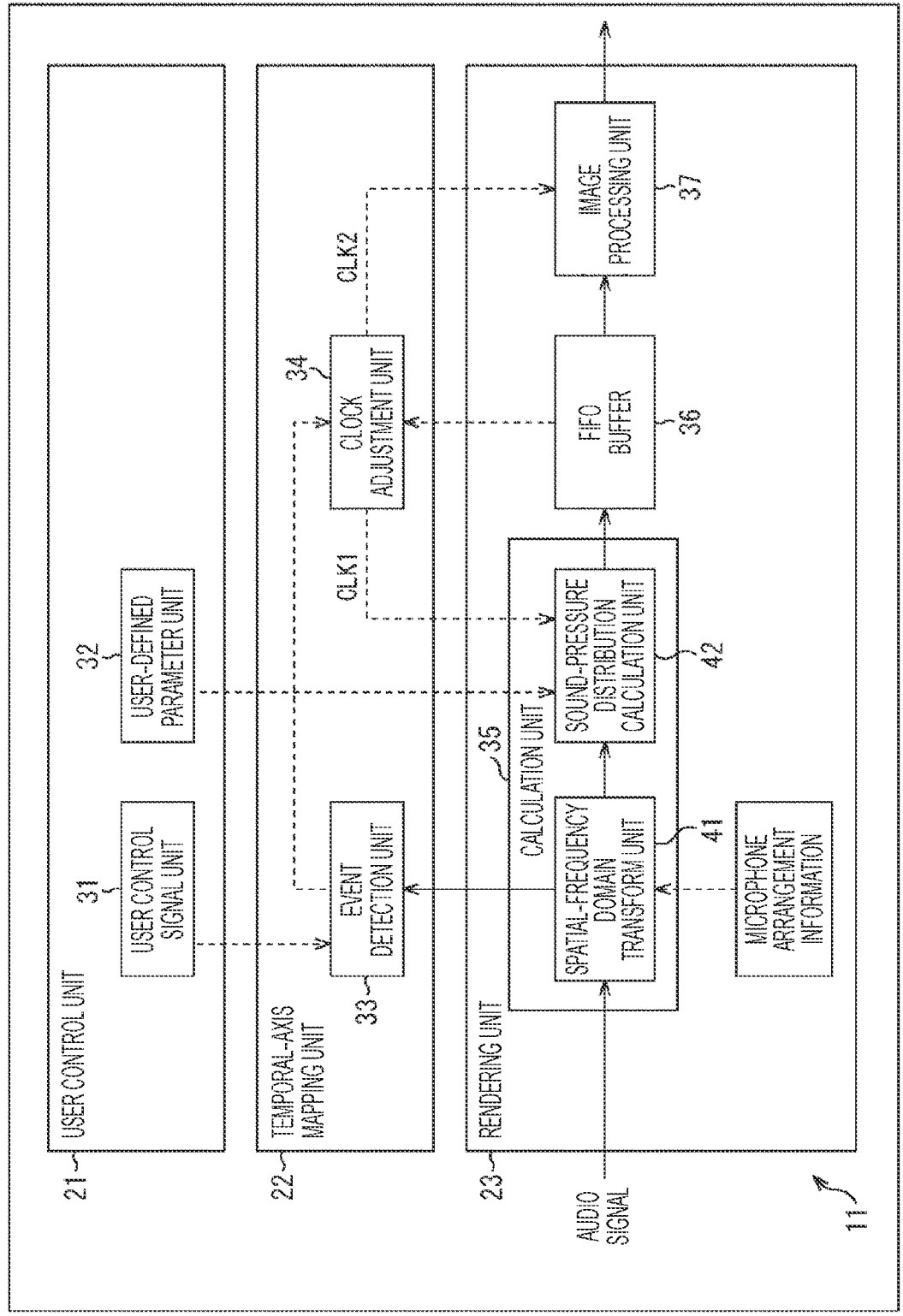
FIG. 2 illustrates an exemplary configuration of a sound-field visualization device.

Furthermore, the sound-field visualization device 11 illustrated in FIG. 1 has an exemplary configuration illustrated in FIG. 2.

The sound-field visualization device 11 includes a user control unit 21, a temporal-axis mapping unit 22, and a rendering unit 23.

The user control unit 21 includes, for example, a mouse, a keyboard, a touch panel, a switch, and a button, and functions as an interface allowing a user to control the entire operation of the sound-field visualization device 11.

The user control unit 21 includes a user control signal unit 31 and a user-defined parameter unit 32.

The user control signal unit 31 supplies the temporal-axis mapping unit 22 with a signal corresponding to an operation from the user, to control detection of a predetermined event in the temporal-axis mapping unit 22.

For example, in the sound-field visualization device 11, a phenomenon regarding sound observed in the target space, such as reproduction or occurrence of particular sound, is detected as an event, and the temporal axis of display (rendering) of the image for display is scaled in response to detection of the event, for proper observation of the distribution of sound pressure (sound field) of the particular sound.

In other words, in response to detection of particular sound in the target space, processing of scaling the temporal axis of rendering is performed as temporal-axis mapping processing.

For example, in response to an operation from the user or the like, the user control signal unit 31 supplies, in order to change the classification (type) of particular sound as a detection target, namely, the event of the detection target, the temporal-axis mapping unit 22 with a control signal for an instruction as to selection of a detector for use in detection of the particular sound.

Furthermore, in response to an operation from the user or the like, the user control signal unit 31 may supply the temporal-axis mapping unit 22 with a control signal for an instruction as to the timing of detection of particular sound.

Specifically, for example, the user makes an operation to the user control unit 21, operates a button on a predetermined graphical user interface (GUI), and gives an instruction for the timing of detection of particular sound (event). In other words, made is an instruction input indicating that particular sound has occurred.

In this case, in response to the operation from the user, the user control signal unit 31 supplies the temporal-axis mapping unit 22 with a control signal for an instruction as to the timing of detection of particular sound, namely, a control signal indicating that particular sound has occurred. Then, the temporal-axis mapping unit 22 regards the timing at which the control signal is supplied as the timing at which the event is detected. In other words, in response to an instruction from the user, it is determined that the event has been detected. Alternatively, it may be determined that the event has been detected, at periodic timings, such as at predetermined time intervals, specifically, every few seconds, at irregular timings, such as at random time intervals, or at a designated timing, such as at the point in time designated by the user.

In response to an operation from the user or the like, the user-defined parameter unit 32 supplies the rendering unit 23 with setting information indicating the frequency range of sound pressure to be calculated or the order of a harmonic coefficient.

For example, designation of a frequency range of sound as a display target in the image for display with the setting information enables no performance of a computation of acquiring the distribution of sound pressure, in the other frequency ranges out of the display target, namely, in any unnecessary frequency ranges, so that a reduction can be made in processing load.

Furthermore, for example, designation as to up to what order a computation of acquiring the distribution of sound pressure should be performed, with the setting information, enables a reduction in processing load.

For example, computation of the harmonic coefficient up to a higher order enables more accurate calculation of the distribution of sound pressure. However, an increase in computational complexity is made by the higher order, resulting in a rise in processing load.

Note that the order of the harmonic coefficient to be computed may be designated by the user or may be automatically determined, in accordance with the throughput or processing load of the sound-field visualization device 11, on the software side on which the sound-field visualization device 11 is controlled.

The temporal-axis mapping unit 22 performs temporal-axis mapping processing, for example, on the basis of the control signal supplied from the user control unit 21 or the audio signal supplied from the rendering unit 23.

The temporal-axis mapping unit 22 includes an event detection unit 33 and a clock adjustment unit 34.

The event detection unit 33 detects an event, for example, on the basis of the control signal supplied from the user control signal unit 31 or the audio signal supplied from the rendering unit 23, and supplies a detection result thereof to the clock adjustment unit 34.

The clock adjustment unit 34 always generates a clock signal CLK1 indicating the timing of calculation of the distribution of sound pressure and a clock signal CLK2 indicating the timing of rendering of the image for display, and supplies the clock signal CLK1 and the clock signal CLK2 to the rendering unit 23. The clock signal CLK1 and the clock signal CLK2 each serve as a variable clock that is variable in clock frequency, namely, in clock cycle.

The clock adjustment unit 34 starts temporal-axis mapping processing at the timing at which the detection result indicating that the event has been detected is supplied from the event detection unit 33.

The clock adjustment unit 34 performs, as the temporal-axis mapping processing, processing of changing the clock frequency (cycle) of the clock signal CLK1 and the clock frequency (cycle) of the clock signal CLK2 properly between the respective timings.

For example, relatively changing in clock cycle between the clock signal CLK1 and the clock signal CLK2 can be regarded as scaling the temporal axis of rendering of the image for display, namely, scaling the timing of rendering in the temporal direction to change the rate of reproduction of the image for display.

The rendering unit 23 performs calculation of the distribution of sound pressure and rendering of the distribution of sound pressure, in accordance with the clock signal CLK1 and the clock signal CLK2 supplied from the clock adjustment unit 34.

That is, on the basis of the multichannel audio signal supplied from the microphone array 12 and the setting information supplied from the user-defined parameter unit 32, the rendering unit 23 calculates the distribution of sound pressure to generate the image for display.

The rendering unit 23 includes a calculation unit 35, a first in first out (FIFO) buffer 36, and an image processing unit 37.

The calculation unit 35 calculates sound-pressure distribution information indicating the distribution of sound pressure in the target space, on the basis of the multichannel audio signal acquired by the sound pickup of the microphone array 12 and microphone arrangement information indicating the arrangement position of each microphone included in the microphone array 12.

The sound-pressure distribution information indicates the sound pressure at each position in the target space. Thus, the sound-pressure distribution information can be regarded as indicating the amplitude and phase of sound at each position in the target space.

Note that, in the following, described will be exemplary generation of the image for display indicating the distribution of sound pressure in the target space, namely, the wavefronts of sound in the target space, based on the sound-pressure distribution information.

However, the image for display may be an image indicating the amplitude of sound at each position in the target space or may be an image indicating the phase of sound at each position in the target space. That is, the image for display may be an image indicating at least one of the amplitude or phase of sound at each position in the target space. Furthermore, the sound-pressure distribution information that the calculation unit 35 calculates is only required to indicate at least one of the amplitude or phase of sound at each position in the target space.

The calculation unit 35 includes a spatial-frequency domain transform unit 41 and a sound-pressure distribution calculation unit 42.

The spatial-frequency domain transform unit 41 is supplied with the multichannel audio signal acquired by the sound pickup of the microphone array 12 and the microphone arrangement information indicating the arrangement position of each microphone included in the microphone array 12.

On the basis of the supplied audio signal and microphone arrangement information, the spatial-frequency domain transform unit 41 transforms the audio signal as a temporal signal into a harmonic coefficient as a signal in spatial-frequency domain (spatial-frequency domain signal), and supplies the harmonic coefficient to the sound-pressure distribution calculation unit 42.

Furthermore, the spatial-frequency domain transform unit 41 supplies the event detection unit 33, appropriately, with the audio signal as a temporal signal, a signal in temporal-frequency domain and the harmonic coefficient that are acquired from the audio signal.

The sound-pressure distribution calculation unit 42 operates in accordance with the clock signal CLK1 supplied from the clock adjustment unit 34.

That is, on the basis of the setting information supplied from the user-defined parameter unit 32 and the harmonic coefficient supplied from the spatial-frequency domain transform unit 41, the sound-pressure distribution calculation unit 42 acquires the sound pressure at each position in the target space, to calculate the distribution of sound pressure of sound in the target space.

Furthermore, the sound-pressure distribution calculation unit 42 supplies the sound-pressure distribution information indicating the distribution of sound pressure in the target space, to the FIFO buffer 36, for temporary retention (record).

For example, at the timing indicated by the clock signal CLK1, such as the timing of rising of the clock signal CLK1, the sound-pressure distribution calculation unit 42 generates the sound-pressure distribution information at a certain point in time (timing), and then supplies the sound-pressure distribution information to the FIFO buffer 36.

The FIFO buffer 36 temporarily retains the sound-pressure distribution information supplied from the sound-pressure distribution calculation unit 42, and supplies the sound-pressure distribution information being retained to the image processing unit 37.

Furthermore, the FIFO buffer 36 supplies the record status (retention status) of the sound-pressure distribution information therein (in the buffer), to the clock adjustment unit 34. The record status is used for the temporal-axis mapping processing.

The image processing unit 37 operates in accordance with the clock signal CLK2 supplied from the clock adjustment unit 34, to perform rendering of the sound-pressure distribution information to the display device 13.

That is, at the timing indicated by the clock signal CLK2, such as the timing of rising of the clock signal CLK2, the image processing unit 37 reads the sound-pressure distribution information for one point in time from the FIFO buffer 36, and then generates the image for display, on the basis of the sound-pressure distribution information. Then, the image processing unit 37 outputs the generated image for display to the following display device 13, for display.

Here, the image for display visually illustrates the distribution of sound pressure of sound in the target space at a certain point in time, namely, the amplitude and phase of sound at each position in the target space at a certain point in time. In other words, the image for display visually renders the condition of wavefronts of sound for one point in time.

More particularly, the image for display serves as a moving image indicating a temporal change in the condition of wavefronts of sound in the target space, and the image processing unit 37 outputs one frame of image included in the image for display, at the timing indicated by the clock signal CLK2.

At this time, the one frame of image is an image indicating the wavefronts of sound in the target space at a certain point in time. Therefore, the frame rate of the image for display as a moving image is determined by the clock signal CLK2 that controls the operation of the image processing unit 37.

As above, the sound-field visualization device 11 enables achievement of scaling control of the temporal axis of rendering of the image for display with introduction of the FIFO buffer 36 and change control of the clock frequencies of the clock signal CLK1 and the clock signal CLK2.

<Processing in Each Unit in Sound-Field Visualization Device>

Next, the temporal-axis mapping processing in the temporal-axis mapping unit 22 and calculation of the distribution of sound pressure and rendering control of the image for display in the rendering unit 23 will be described in more detail.

First, calculation of the harmonic coefficient in the spatial-frequency domain transform unit 41 will be described.

As described above, the spatial-frequency domain transform unit 41 is a block that transforms the audio signal as a temporal signal of sound observed by the microphone array 12 into the harmonic coefficient as a spatial-frequency domain signal of the sound field.

The multichannel audio signal supplied to the spatial-frequency domain transform unit 41 is first transformed into a temporal-frequency signal by discrete Fourier transform (DFT).

Next, spherical harmonics transform (SHT) or cylindrical harmonics transform (CHT) is performed to the temporal-frequency signal, resulting in acquisition of a spherical harmonic coefficient or a cylindrical harmonic coefficient.

That is, the temporal-frequency signal is transformed into the harmonic coefficient as a spatial-frequency domain signal by SHT or CHT.

Note that SHT is described in detail, for example, in "B. Rafaely, "The Spherical-Shell Microphone Array", IEEE Transactions on Audio, Speech, and Language Processing, 2008".

For example, in a case where the microphones included in the microphone array 12 are disposed annularly or spherically, the transformation of SHT is given as the following Expression (1).

[Mathematical Expression 1]

$$a_{mn}(k) = \sum_{q=0}^{Q-1} \frac{p_k(r, \theta_q, \phi_q)}{b_n(kr)} Y_n^{*m}(\theta_q, \phi_q) \quad (1)$$

Note that, in Expression (1), $a_{mn}(k)$ represents a spherical harmonic coefficient and $Y^{*m}_n(\theta_q, \varphi_q)$ represents a spherical harmonic basis.

In particular, m and n each represent an order in the spherical harmonic coefficient $a_{mn}(k)$. Furthermore, k represents the wavenumber of the signal and fulfills the following expression: $k=2\pi f/c_s$ where f represents frequency and $c_s$ represents the speed of sound.

Moreover, $\theta_q$ and $\varphi_q$ represent, respectively, the elevation and azimuth indicating the position of the q-th microphone among Q number of microphones in total included in the microphone array 12, and represents a complex conjugate.

Furthermore, in Expression (1), $b_n(kr)$ represents a radial function, such as a spherical Bessel function and r represents the radius of the microphone array 12.

Therefore, herein, the arrangement position of the q-th microphone included in the microphone array 12 is expressed by the coordinates $(r, \theta_q, \varphi_q)$ in a spherical coordinate system with the center position of the microphone array 12 as the original. That is, the position expressed by the coordinates $(r, \theta_q, \varphi_q)$ corresponds to an observation position of sound.

Moreover, in Expression (1), $p_k(r, \theta_q, \varphi_q)$ represents the sound pressure of sound observed at the arrangement position of the q-th microphone in the microphone array 12 indicated by the coordinates $(r, \theta_q, \varphi_q)$ in the spherical coordinate system, namely, the sound pressure of sound picked up by the q-th microphone.

For example, the microphone array 12 includes Q number of microphones. In that case, an expression of transforming the sound pressure picked up at the arrangement of an arbitrary microphone, namely, at an arbitrary observation position (temporal-frequency signal) into a vector $a_k$ having the spherical harmonic coefficient $a_{mn}(k)$ with the order n and the order m is given as the following Expression (2).

[Mathematical Expression 2]

$$a_k = B_k^\dagger p_k \quad (2)$$

Note that, as expressed by the following Expression (3), $p_k$ in Expression (2) represents a matrix including the sound pressure $p_k(r_q, \theta_q, \varphi_q)$ (note that, $0 \le q \le L$) acquired by each microphone included in the microphone array 12.

Furthermore, as expressed by the following Expression (4), $B_k$ in Expression (2) represents a transformation matrix including, as an element, the product of a spherical Bessel function $b_n(kr_q)$ and a spherical harmonic function $Y^m_n(\theta_q, \varphi_q)$ for each combination of the order n and the order m, and $B^\dagger_k$ represents a generalized inverse of the transformation matrix $B_k$.

[Mathematical Expression 3]

$$p_k = \begin{bmatrix} p_k(r_0, \theta_0, \phi_0) \\ p_k(r_1, \theta_1, \phi_1) \\ \vdots \\ p_k(r_L, \theta_L, \phi_L) \end{bmatrix}, L = Q-1 \quad (3)$$

-continued

[Mathematical Expression 4]

$$B_k = \begin{bmatrix} b_0(kr_0)Y_0^0(\theta_0, \phi_0) & b_0(kr_0)Y_1^{-1}(\theta_0, \phi_0) & \ldots & b_0(kr_0)Y_N^M(\theta_0, \phi_0) \\ \vdots & \vdots & & \vdots \\ b_0(kr_L)Y_0^0(\theta_L, \phi_L) & b_1(kr_L)Y_1^{-1}(\theta_L, \phi_L) & \ldots & b_N(kr_L)Y_N^M(\theta_L, \phi_L) \end{bmatrix} \quad (4)$$

The accuracy of the spherical harmonic coefficient $a_{mn}(k)$ acquired by the above Expression (2) is determined by the condition number of the transformation matrix $B_k$ indicated in Expression (4).

For acquisition of a more accurate spherical harmonic coefficient $a_{mn}(k)$, it is important to perform calculation of Expression (2) with the transformation matrix $B_k$ excellent in condition number, namely, with the transformation matrix $B_k$ small in condition number. This arrangement corresponds to proper determination of the position of each microphone included in the microphone array 12.

As above, when the spatial-frequency domain transform unit 41 acquires the harmonic coefficient, the sound-pressure distribution calculation unit 42 acquires the sound pressure at an arbitrary position in the target space, on the basis of the harmonic coefficient.

For example, in a case where the spherical harmonic coefficient $a_{mn}(k)$ is acquired with the above Expression (2) as the harmonic coefficient, calculation of the following Expression (5) enables acquisition of the sound pressure $p_k(r_d, \theta_d, \varphi_d)$ at an arbitrary position indicated by the coordinates $(r_d, \theta_d, \varphi_d)$ in the spherical coordinate system.

[Mathematical Expression 5]

$$p_k(r_d, \theta_d, \phi_d) = \sum_{n=0}^{N} \sum_{m=-n}^{n} a_{mn}(k)b_n(kr_d)Y_n^m(\theta_d, \phi_d) \quad (5)$$

In the example, as setting information, provided are information indicating for what wavenumber k the sound pressure $p_k(r_d, \theta_d, \varphi_d)$ should be acquired, namely, information indicating frequency f for specifying the wavenumber k, and information indicating up to what order n calculation should be performed in Expression (5), namely, information indicating the maximal order N of the order n. Then, such setting information is supplied from the user-defined parameter unit 32 to the sound-pressure distribution calculation unit 42.

As above, calculation of Expression (5) for each of the positions of a plurality of coordinates $(r_d, \theta_d, \varphi_d)$ enables acquisition of the sound pressure $p_k(r_d, \theta_d, \varphi_d)$ for any position out of the arrangement positions of the microphones, namely, for any position at which no sound pressure is observed.

Therefore, for example, the target space having a sound field is divided into grids arbitrary in size and the sound pressure in each grid is acquired with Expression (5), so that the sound-pressure distribution information indicating the distribution of sound pressure in the entire target space can be acquired. In other words, the distribution of sound pressure in the entire target space is acquired.

The sound-pressure distribution information acquired by the sound-pressure distribution calculation unit 42 is supplied to the FIFO buffer 36, for retention. Then, the image processing unit 37 reads the sound-pressure distribution information from the FIFO buffer 36 and generates the image for display.

Figure 3:
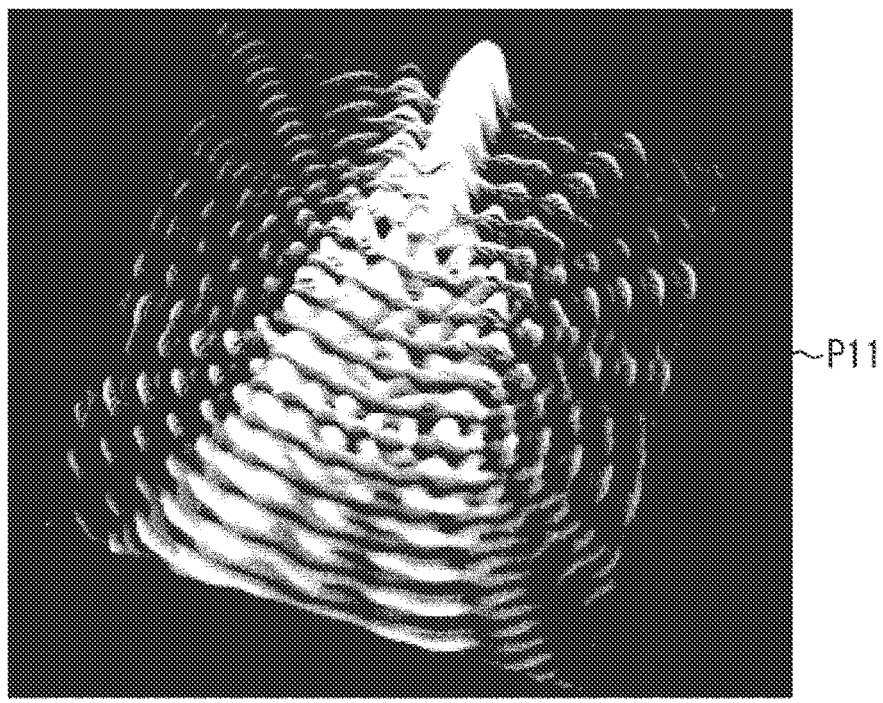
FIG. 3 illustrates an exemplary image for display.

Thus, for example, the image for display is acquired as illustrated in FIG. 3.

In the example illustrated in FIG. 3, the image for display P11 is displayed on the display device 13.

Note that, in the example, the microphones in the microphone array 12 are disposed side by side on a two-dimensional plane parallel to the floor in the target space, and, for example, the sound of content is laterally radiated to the microphone array 12 in the target space.

In the image for display P11, displayed is the condition of the sound field in the entire target space, namely, the condition of wavefronts of sound (sound waves). In particular, herein, the image for display P11 indicates the condition in the target space viewed downward from the ceiling side.

Furthermore, in the image for display P11, the height at each position of curves indicating the wavefronts of sound (sound waves) indicates the amplitude of sound at each position, and the density in color at each position indicates the phase of sound at each position. That is, in the image for display P11, the sound field formed in the target space (distribution of sound pressure) is visualized due to the amplitude and phase at each position.

From the amplitude and phase at each position indicated in the image for display P11, it can be found that the condition of wavefronts of sound output from the ceiling side in the target space is reproduced accurately. Such display of the image for display P11 enables the user to observe the straightness or reflection of sound, clearly.

In the sound-field visualization system, the image for display may be displayed in real time on the display device 13, or the audio signal or the harmonic coefficient may be saved as collection data and later the image for display may be generated offline for display.

For example, in a case where the image for display is displayed offline, the frequency or the order of the harmonic coefficient, to be designated, is changed with the setting information, so that the image for display with the frequency range or order corresponding to the setting information can be displayed.

In this case, the image processing unit 37 enables the distribution of sound pressure to be displayed every multiple frequencies (wavenumbers) in the image for display, the image for display for each frequency to be individually or simultaneously displayed, or the image for display with a frequency range including a plurality of frequencies to be displayed.

Note that, even in a case where the image for display is displayed in real time, the frequency or the order of the harmonic coefficient can be changed with the setting information, and the distribution of sound pressure can be displayed, for example, every multiple frequencies (wavenumbers). However, comparison of the image for display at the same point in time every piece of setting information with the setting information being changed, in real time is more difficult than offline.

As above, acquisition of the sound-pressure distribution information indicating the distribution of sound pressure in the entire target space enables generation of the image for display indicating the distribution of sound pressure in the entire target space indicated by the sound-pressure distribution information, namely, the amplitude and phase of each wavefront of sound, so that the sound field formed in the entire target space can be visualized.

In particular, in the sound-field visualization device 11, the audio signal acquired, as an observation result, from sound observation at some positions in the target space is transformed into the harmonic coefficient, so that the sound pressure at any position at which no sound is actually observed can be properly acquired. Thus, the sound field can be visualized more easily and accurately.

In addition, performed can be in real time the processing in which the audio signal acquired by sound pickup is transformed into the harmonic coefficient, the distribution of sound pressure is calculated from the acquired harmonic coefficient, and the image for display is generated, so that the change of wavefronts of sound in the target space can be observed in real time.

Next, the temporal-axis mapping processing in the temporal-axis mapping unit 22 will be described.

In the target space, sound propagates at a speed of approximately 340 m/sec. Therefore, even when, in accordance with the propagation speed of sound, the change of wavefronts of sound in the target space is displayed with the image for display on the display device 13, the distribution of sound pressure changes instantaneously. Thus, the image for display is difficult for the user to view.

Therefore, in the sound-field visualization device 11, the respective clock cycles (clock frequencies) of the clock signal CLK1 and the clock signal CLK2 described above are adjusted by the temporal-axis mapping processing, so that the timing of calculation of the sound pressure and the timing of rendering of the image for display are adjusted. Thus, a proper image for display (picture) with the temporal axis scaled is presented to the user.

Specifically, in a normal state, the distribution of sound pressure is calculated from the harmonic coefficient at constant time intervals, such as 30 frame/sec, namely, at a constant clock frequency, so that the image for display acquired from the sound-pressure distribution information is output to the display device 13. In this case, for example, the clock signal CLK1 and the clock signal CLK2 are identical in clock frequency.

After that, when the event detection unit 33 detects an event that the user desires to observe in detail (acoustic event), namely, particular sound that the user desires to observe, the clock adjustment unit 34 adjusts the respective clock frequencies of the clock signal CLK1 and the clock signal CLK2, properly.

Thus, for example, slow display of the change of wavefronts of sound after the timing at which the event is detected enables the user to observe in more detail the wavefronts of sound in the target space after occurrence of the event.

Here, event detection and clock-signal adjustment will be described in more detail.

For example, in an exemplary case where the event detection unit 33 detects an event automatically without any designation or the like from the user, the event detection unit 33 retains in advance a detector that detects, as a predetermined classification of sound, sound having a signal level larger than a certain level (audio signal).

Furthermore, with the retained detector, the event detection unit 33 always monitors the audio signal supplied from the spatial-frequency domain transform unit 41 after acquired by the microphone array 12. When the signal level of the supplied audio signal exceeds a predetermined threshold, the event detection unit 33 determines that the event has been detected. That is, when sound having a signal level larger than the predetermined threshold (predetermined level) is observed, it is determined that the event has been detected.

Note that, when observed is sound having a signal level in a predetermined level range, such as not more than a predetermined signal level, it may be determined that the event has been detected. Furthermore, the example in which the event is detected on the basis of the signal level of the audio signal has been given herein. However, alternatively, in a case where, as a predetermined classification of sound, observed is sound in a predetermined range, such as sound having a particular frequency at a level larger than a predetermined threshold (predetermined level) (temporal-frequency signal) or sound having the particular frequency at a level smaller than a predetermined threshold, it may be determined that the event has been detected.

Furthermore, for example, on the basis of a variation in the level of the audio signal in each frequency range, a sharp change in the waveform of the audio signal, or the spectral shape of the audio signal, the event may be detected.

Specifically, for example, in a case where the event is detected on the basis of a spectral shape, the event detection unit 33 retains a detector that detects a previously determined particular spectral shape.

Then, on the basis of the retained detector and the temporal-frequency signal from the spatial-frequency domain transform unit 41, the event detection unit 33 determines that the event has been detected, when sound having the particular spectral shape is observed, namely, when the temporal-frequency signal having the particular spectral shape is supplied.

Note that any detector may be used for detection of the event as long as detected can be sound that the user desires to render, namely, to observe, such as the audio signal not less than a certain level or the audio signal having a particular spectral shape. For example, a general-purpose detector in common use is available for event detection.

Alternatively, the event detection unit 33 may detect the event, on the basis of information supplied from an external block (device), such as an image supplied from a camera not illustrated.

Specifically, for example, on the basis of an image including the target space as a subject, the event detection unit 33 may detect, as the event, a change in the brightness of space, such as brightening or darkening of the target space, or the presence or absence of a person, such as entry of a person into the target space.

Furthermore, one or a plurality of detectors may be retained in the event detection unit 33.

For example, in a case where the event detection unit 33 retains a detector every multiple events, the user can give an instruction for detection of a desired event by operating the user control unit 21. In other words, the user can give an instruction for selection of a detector for use in event detection.

In that case, the event detection unit 33 detects the event with the detector indicated by the control signal supplied from the user control signal unit 31 in response to an operation from the user, among the plurality of detectors retained in advance.

Alternatively, the user may give an instruction for the timing of detection of the event by operating the user control unit 21. In that case, the user control signal unit 31 supplies the event detection unit 33 with the control signal corresponding to an operation from the user. When the control signal is supplied from the user control signal unit 31, the event detection unit 33 determines that the event has been detected, and supplies the clock adjustment unit 34 with a detection result indicating that the event has been detected.

Next, described will be specific exemplary adjustment of the respective clock frequencies of the clock signal CLK1 and the clock signal CLK2, corresponding to a detection result of the event.

Figure 4:
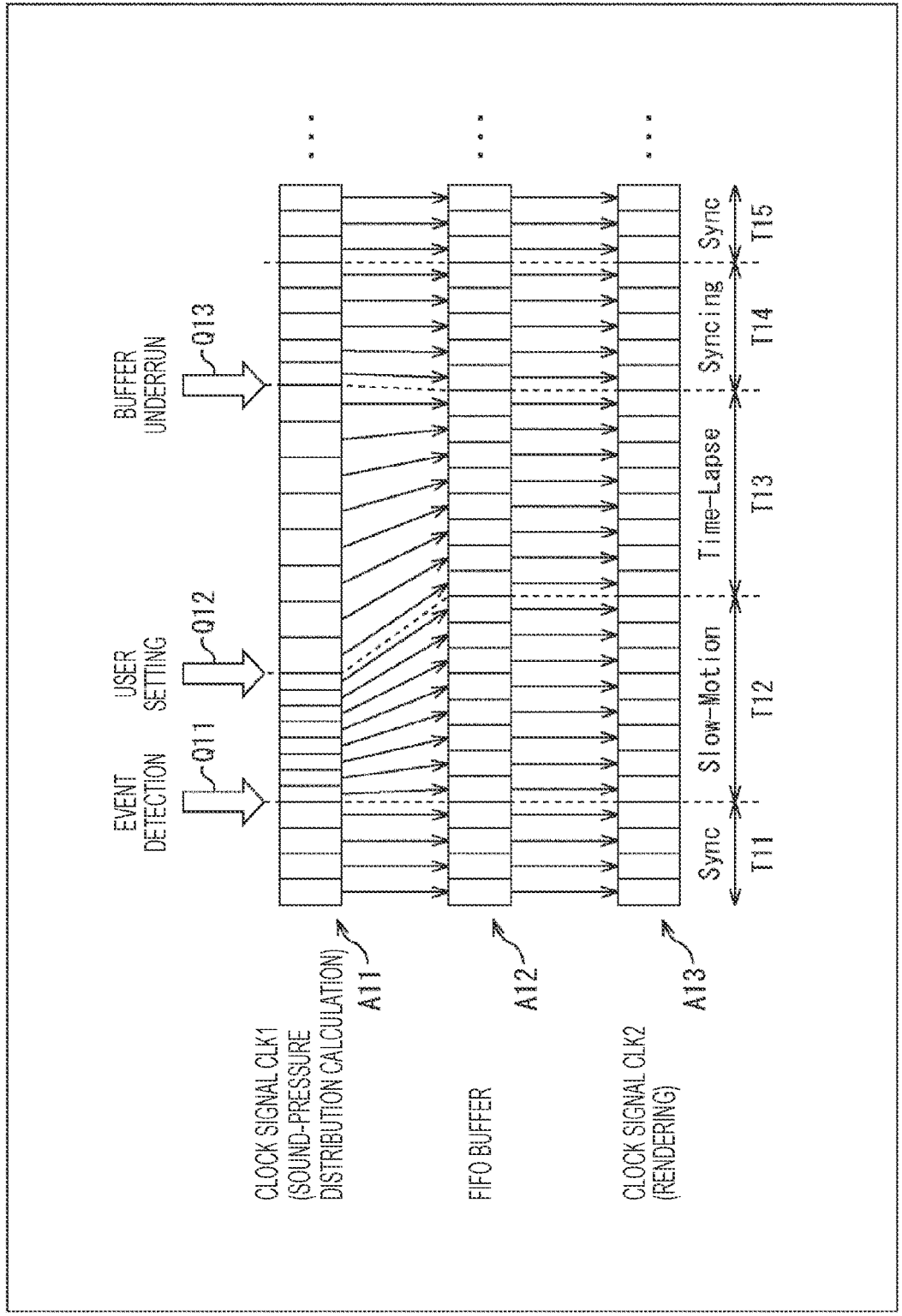
FIG. 4 is an explanatory diagram of adjustment of clock signals.

In the clock adjustment unit 34, for example, as illustrated in FIG. 4, the respective clock frequencies of the clock signal CLK1 and the clock signal CLK2 are adjusted. Note that the lateral direction in FIG. 4 indicates time, and particularly the right direction in the figure indicates the future.

In FIG. 4, the sound-pressure distribution information at each point in time (timing) generated by the sound-pressure distribution calculation unit 42 in accordance with the clock signal CLK1 is indicated in the part indicated by an arrow A11.

In particular, in the part indicated by the arrow A11, one rectangle represents the sound-pressure distribution information at one point in time.

In the sound-pressure distribution calculation unit 42, for example, the sound-pressure distribution information at one point in time is generated at the timing of one clock of the clock signal CLK1, namely, at the timing of rising of the clock signal CLK1. Therefore, a narrower width in the lateral direction in the figure of a rectangle representing the sound-pressure distribution information corresponds to a higher clock frequency of the clock signal CLK1 (shorter cycle).

Furthermore, the sound-pressure distribution information stored (retained) in the FIFO buffer 36 after output from the sound-pressure distribution calculation unit 42, at each point in time, is indicated in the part indicated by an arrow A12.

In particular, in the part indicated by the arrow A12, one rectangle represents the sound-pressure distribution information at one point in time. Furthermore, a rectangle in the part indicated by the arrow A11 and a rectangle in the part indicated by the arrow A12 in connection through an arrow represent the sound-pressure distribution information at the same point in time.

In the part indicated by the arrow A12, the width in the lateral direction in the figure of a rectangle representing the sound-pressure distribution information indicates the period for which the sound-pressure distribution information is being retained in the FIFO buffer 36.

Moreover, the image for display generated by the image processing unit 37 on the basis of the sound-pressure distribution information read from the FIFO buffer 36, at each point in time, is indicated in the part indicated by an arrow A13. In other words, in the part indicated by the arrow A13, the image for display displayed on the display device 13 after output from the image processing unit 37 is indicated.

In particular, in the part indicated by the arrow A13, one rectangle represents the image for display generated from the sound-pressure distribution information at one point in time, more particularly, one frame of image for display.

Furthermore, a rectangle in the part indicated by the arrow A12 in connection with a rectangle representing one image for display (frame) indicated in the part indicated by the arrow A13, through an arrow, represents the sound-pressure distribution information used in generation of the image for display.

In the part indicated by the arrow A13, the width in the lateral direction in the figure of a rectangle representing one frame of image for display indicates the period of display of the frame of the image for display, in other words, the frame rate of the image for display.

In the example of FIG. 4, when an instruction for display of the image for display is given first, the state of reproduction of the image for display determined by the respective clock frequencies of the clock signal CLK1 and the clock signal CLK2, namely, the state (state) of the temporal axis is brought to the Sync state as the normal state.

In FIG. 4, a period T11 corresponds to the period of the Sync state.

In the Sync state, the clock signal CLK1 and the clock signal CLK2 are identical in clock frequency, and the clock signal CLK1 and the clock signal CLK2 are in synchronization.

That is, the clock adjustment unit 34 supplies the clock signal CLK1 and the clock signal CLK2 that are identical in clock frequency and are in mutual synchronization, to the sound-pressure distribution calculation unit 42 and the image processing unit 37, respectively.

Therefore, in the period T11, at constant time intervals, performed are acquisition of the sound-pressure distribution information, retention of the sound-pressure distribution information in the FIFO buffer 36, generation of the image for display from the sound-pressure distribution information, and rendering (display) of the image for display on the display device 13. That is, calculation of the sound-pressure distribution information and display of the image for display (update of display) are performed at the same time intervals.

In such a state, for example, detection of an event at the timing indicated by an arrow Q11 causes the state of the temporal axis to transition from the Sync state to the Slow-Motion state. In the Slow-Motion state, the image for display is subjected to slow display.

In FIG. 4, a period T12 corresponds to the period of the Slow-Motion state.

When a detection result indicating that the event has been detected is supplied from the event detection unit 33, the clock adjustment unit 34 brings the state of the temporal axis to the Slow-Motion state.

Specifically, the clock adjustment unit 34 changes the clock frequency of the clock signal CLK1 to a clock frequency higher than that in the Sync state, and keeps the clock frequency of the clock signal CLK2 the same as that in the Sync state.

Thus, calculation of the sound-pressure distribution information in the sound-pressure distribution calculation unit 42 is controlled by the clock adjustment unit 34 such that the time interval of calculation of the sound-pressure distribution information in the Slow-Motion state is shorter than in the Sync state.

A higher clock frequency of the clock signal CLK1, namely, a shorter clock cycle of the clock signal CLK1 causes the sound-pressure distribution calculation unit 42 to calculate the distribution of sound pressure with a higher temporal resolution.

That is, with a shorter temporal section as a target, the sound-pressure distribution information is acquired every temporal section, so that the distribution of sound pressure is analyzed more minutely in the temporal direction.

The sound-pressure distribution information acquired as above is supplied to the image processing unit 37 through the FIFO buffer 36. The image processing unit 37 generates the image for display, in accordance with the clock signal CLK2 having the same clock frequency as in the Sync state.

In this case, the temporal axis of rendering of the wavefronts of sound acquired by observation, namely, the temporal axis of display of the image for display is relatively extended to the observation of sound in the target space.

Specifically, the time span of actual observation in the target space of the wavefronts indicated by the image for display, namely, the target period for calculation of the sound-pressure distribution information corresponds to the period of one cycle of the clock signal CLK1. In other words, the sound-pressure distribution information is updated for the time span of one cycle of the clock signal CLK1.

In contrast to this, the time span of presentation of one frame of the image for display corresponds to the period of one cycle of the clock signal CLK2. That is, the display of the image for display is updated for the time span of one cycle of the clock signal CLK2.

In the Slow-Motion state, because the cycle of the clock signal CLK2 is longer than the cycle of the clock signal CLK1, the time span of presentation of one frame of the image for display is longer than the time span (period) of actual observation in the target space of the wavefronts of sound displayed by one frame of the image for display.

In other words, in the Slow-Motion state, the clock adjustment unit 34 controls the image processing unit 37 such that the display of the image for display is updated at time intervals each longer than the time interval of calculation of the sound-pressure distribution information.

Thus, the image for display is displayed (reproduced) such that the temporal change of distribution of sound pressure in the target space, namely, the temporal change of wavefronts of sound is slower than the actual temporal change.

Such display of the image for display is regarded as slow display (slow reproduction) of the temporal change of wavefronts of sound.

Slow display of the image for display as above causes, on the display device 13, the wavefronts of sound in the target space to change slower than the actual, so that the user can observe the wavefronts of sound or the temporal change of wavefronts of sound, in detail.

In the Slow-Motion state, for example, when the event terminates at the timing indicated by an arrow Q12, the state of the temporal axis transitions from the Slow-Motion state to the Time-Lapse state.

In FIG. 4, a period T13 corresponds to the period of the Time-Lapse state.

Note that, in the example of FIG. 4, in the sound-pressure distribution calculation unit 42, transition to the Time-Lapse state is performed immediately at the timing of termination of the event indicated by the arrow Q12. However, in the image processing unit 37, transition to the Time-Lapse state is performed at the timing of termination of display of the image for display corresponding to the sound-pressure distribution information acquired in the Slow-Motion state.

In other words, the clock adjustment unit 34 outputs the clock signal CLK2 at the clock frequency in the Slow-Motion state, by the number of clocks output as the clock signal CLK1 in the period of the Slow-Motion state, and then starts to output the clock signal CLK2 at the clock frequency in the Time-Lapse state.

At the time of transition in another state, performed is processing similar to that at the time of transition from the Slow-Motion state to the Time-Lapse state. That is, at the time of transition of the state of the temporal axis, the timing of change of the clock frequency of each clock signal is controlled such that the respective numbers of clocks output as the clock signal CLK1 and the clock signal CLK2 are the same in each state of the temporal axis.

Furthermore, the timing of termination of the event can be set, for example, by the user.

Specifically, for example, the user can set in advance the duration (length) of an event to be observed in the Slow-Motion state to an arbitrary length, by operating the user control unit 21.

In this case, on the basis of the control signal supplied from the user control signal unit 31 in response to an operation from the user, the event detection unit 33 sets the duration of the event (hereinafter, also referred to as event duration) to the length designated by the user. Then, at the timing of elapse of the determined event duration after detection of the event, the event detection unit 33 supplies the clock adjustment unit 34 with a detection result indicating that the event has terminated.

When the detection result indicating that the event has terminated is supplied from the event detection unit 33, the clock adjustment unit 34 causes the state of the temporal axis to transition from the Slow-Motion state to the Time-Lapse state.

Alternatively, for example, on the basis of the audio signal supplied from the spatial-frequency domain transform unit 41, the event detection unit 33 may detect the determination of the event.

In that case, for example, after detection of the event, the event detection unit 33 continues detection of the event on the basis of the detector and the audio signal, and determines that the event has terminated, at the timing at which the event is not detected any more.

In the Time-Lapse state, the clock adjustment unit 34 changes the clock frequency of the clock signal CLK1 to a clock frequency lower than that in the Sync state, and keeps the clock frequency of the clock signal CLK2 the same as that in the Sync state.

Thus, calculation of the sound-pressure distribution information in the sound-pressure distribution calculation unit 42 is controlled by the clock adjustment unit 34 such that the time interval of calculation of the sound-pressure distribution information in the Time-Lapse state is longer than in the Sync state.

A lower clock frequency of the clock signal CLK1, namely, a longer clock cycle of the clock signal CLK1 causes the sound-pressure distribution calculation unit 42 to calculate the sound-pressure distribution information with a lower temporal resolution.

In the Sync state described above, the timing of calculation of the sound-pressure distribution information is in synchronization with the timing of presentation of the image for display, namely, the timing of presentation of wavefronts of sound.

However, in the following Slow-Motion state, the timing of presentation of the image for display is slower than the timing of calculation of the corresponding sound-pressure distribution information. Every time the display of the image for display is updated, the difference between the respective timings thereof increases.

Therefore, depending on the length of the period of the event, at the timing of termination of the event, displayed is the wavefronts at a timing considerably previous to the wavefronts of sound in the target space at the present time.

Thus, in the Time-Lapse state, control is performed such that the clock frequency of the clock signal CLK1 is lower than the clock frequency of the clock signal CLK2, so that the difference between the timing of calculation of the sound-pressure distribution information and the timing of presentation of the image for display decreases.

Then, the state comes gradually close to the state where the timing of calculation of the sound-pressure distribution information and the timing of presentation of the image for display are in synchronization, namely, the Sync state.

In this case, inversely to the Slow-Motion state, the image for display is displayed such that the temporal change of wavefronts of sound in the target space, namely, the temporal change of distribution of sound pressure is faster than the actual temporal change on the image for display (fast reproduction).

Here, in the Time-Lapse state, it is desirable that, ultimately, the timing of calculation of the sound-pressure distribution information and the timing of presentation of the image for display are perfectly in synchronization. However, depending on the respective temporal resolutions of the clock signal CLK1 and the clock signal CLK2, buffer underrun is likely to occur. That is, underflow of the sound-pressure distribution information is likely to occur in the FIFO buffer 36.

In FIG. 4, if the Time-Lapse state remains, buffer underrun (underflow) occurs immediately after the timing indicated by an arrow Q13. Thus, at the timing indicated by the arrow Q13, the state of the temporal axis transitions from the Time-Lapse state to the Syncing state. In FIG. 4, a period T14 corresponds to the period of the Syncing state.

For example, the clock adjustment unit 34 specifies the timing of transition to the Syncing state, with reference to the record status of the sound-pressure distribution information in the FIFO buffer 36.

In the Syncing state, the clock adjustment unit 34 changes the clock frequency of the clock signal CLK1 such that the timing of calculation of the sound-pressure distribution information and the timing of presentation of the image for display are in synchronization. In particular, in the Syncing state, the clock cycle of the clock signal CLK1 is shorter than the clock cycle of the clock signal CLK2.

Specifically, the clock adjustment unit 34 changes the clock frequency of the clock signal CLK1 such that the clock frequency of the clock signal CLK1 in the Syncing state is lower than in the Slow-Motion state and is higher than in the Sync state.

Thus, calculation of the sound-pressure distribution information in the sound-pressure distribution calculation unit 42 is controlled by the clock adjustment unit 34 such that the time interval of calculation of the sound-pressure distribution information in the Syncing state is longer than in the Slow-Motion state and is shorter than in the Sync state.

The clock adjustment unit 34 causes the state of the temporal axis to transition from the Syncing state to the Sync state, at the timing of synchronization of the timing of calculation of the sound-pressure distribution information and the timing of presentation of the image for display, namely, at the timing of synchronization of the clock signal CLK1 and the clock signal CLK2.

Specifically, the clock adjustment unit 34 causes the clock signal CLK1 and the clock signal CLK2 to be identical in clock frequency. In FIG. 4, a period T15 corresponds to the period of the Sync state.

In response to the Sync state due to re-transition as above, the clock adjustment unit 34 keeps the Sync state without any intermittence until new detection of the event, and causes, in response to new detection of the event, the state of the temporal axis to transition from the Sync state to the Slow-Motion state. Therefore, the period T15 corresponds to the period of a standby state for new event detection.

Note that the return from the Time-Lapse state to the Sync state through the Syncing state has been exemplarily described herein. However, in a case where the clock signal CLK1 and the clock signal CLK2 can be synchronized before occurrence of buffer underrun in the Time-Lapse state, transition from the Time-Lapse state to the Sync state may be performed.

Furthermore, for example, in the Slow-Motion state, overflow is likely to occur in the FIFO buffer 36 retaining the sound-pressure distribution information. In that case, for example, the clock adjustment unit 34 may change the clock frequency of the clock signal CLK2 at a timing before occurrence of overflow such that the clock frequency of the clock signal CLK2 is higher than in the Slow-Motion state.

Moreover, for easy understanding of description, herein given has been the example in which the clock frequency of the clock signal CLK2 for rendering of the image for display is kept constant and only the clock frequency of the clock signal CLK1 for calculation of the sound-pressure distribution information is dynamically changed.

However, the clock frequency of the clock signal CLK2 can be dynamically changed. In the temporal-axis mapping processing, the clock frequency of at least one of the clock signal CLK1 or the clock signal CLK2 is only required to be dynamically changed.

Therefore, for example, in a case where the sound-pressure distribution calculation unit 42 has a high processing load, the clock frequency of the clock signal CLK2 for rendering of the image for display or the clock frequency of the clock signal CLK1 for calculation of the sound-pressure distribution information may be decreased to stabilize the sound-field visualization system.

Furthermore, for example, for a scene requiring rendering of the image for display with a high temporal resolution, both of the clock frequencies of the clock signal CLK1 and the clock signal CLK2 may be increased.

<Description of Sound-Field Visualization Processing>

Here, the operation of the sound-field visualization system will be described. Note that exemplary real-time display of the wavefronts of sound in the target space as the image for display will be described herein.

For example, when, at a timing before formation of a sound field to be visualized, such as reproduction of the sound of content in the target space, an instruction for visualization of the sound field, namely, an instruction for display of the image for display is given, the sound-field visualization system starts sound-field visualization processing. The sound-field visualization processing in the sound-field visualization system will be described below with reference to the flowchart of FIG. 5.

In step S11, the microphone array 12 picks up sound in the target space, and supplies its resultant multichannel audio signal to the spatial-frequency domain transform unit 41.

In step S12, on the basis of supplied microphone arrangement information, the spatial-frequency domain transform unit 41 transforms the multichannel audio signal supplied from the microphone array 12, into a harmonic coefficient, and supplies the harmonic coefficient to the sound-pressure distribution calculation unit 42.

For example, the spatial-frequency domain transform unit 41 performs DFT to the multichannel audio signal and additionally performs SHT or CHT to a temporal-frequency signal acquired by DFT, to calculate the harmonic coefficient. For example, for SHT, the spatial-frequency domain transform unit 41 calculates Expression (2) described above to acquire a spherical harmonic coefficient.

The spatial-frequency domain transform unit 41 supplies the acquired harmonic coefficient to the sound-pressure distribution calculation unit 42, and additionally supplies the audio signal supplied from the microphone array 12, the temporal-frequency signal acquired by DFT, or the harmonic coefficient, to the event detection unit 33.

In step S13, on the basis of setting information supplied from the user-defined parameter unit 32 and the harmonic coefficient supplied from the spatial-frequency domain transform unit 41, the sound-pressure distribution calculation unit 42 calculates the sound pressure at each position in the target space, to generate sound-pressure distribution information.

For example, at the timing of rising of the clock signal CLK1 supplied from the clock adjustment unit 34, the sound-pressure distribution calculation unit 42 calculates Expression (5) for the wavenumber and order determined on the basis of the setting information, and supplies its resultant sound-pressure distribution information for one point in time, to the FIFO buffer 36.

In step S14, at the timing of rising of the clock signal CLK2 supplied from the clock adjustment unit 34, the image processing unit 37 reads the sound-pressure distribution information for one point in time from the FIFO buffer 36, and generates an image for display, on the basis of the sound-pressure distribution information.

In step S15, the image processing unit 37 supplies the image for display generated in step S14 to the display device 13 for display of the image for display. Thus, the display of the image for display is updated on the display device 13 in accordance with the clock signal CLK2.

In step S16, the sound-field visualization device 11 determines whether or not the processing of displaying the image for display should be terminated. For example, in a case where the user operates the user control unit 21 or the like to give an instruction for termination of display of the image for display, it is determined that the processing should be terminated.

In step S16, in a case where it is determined that the processing should not be terminated, the processing goes back to step S11, and then the processing described above is repeated.

In contrast to this, in step S16, in a case where it is determined that the processing should be terminated, each unit in the sound-field visualization system stops operating, so that the sound-field visualization processing is terminated.

As above, the sound-field visualization system picks up sound in the target space, transforms its resultant audio signal into a harmonic coefficient, and calculates the distribution of sound pressure on the basis of the harmonic coefficient. In this manner, the sound pressure at each position in the target space can be acquired easily and accurately, so that the sound field can be visualized more easily.

<Description of Clock Adjustment Processing>

Figure 5:
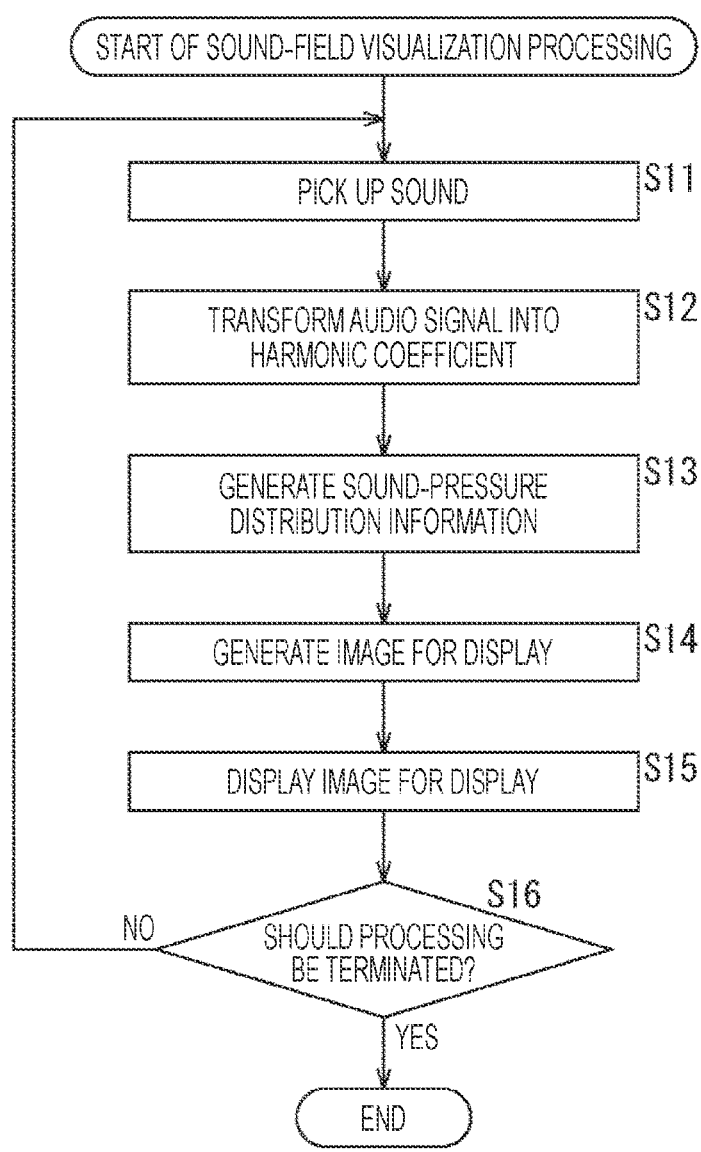
FIG. 5 is an explanatory flowchart of sound-field visualization processing.
Figure 6:
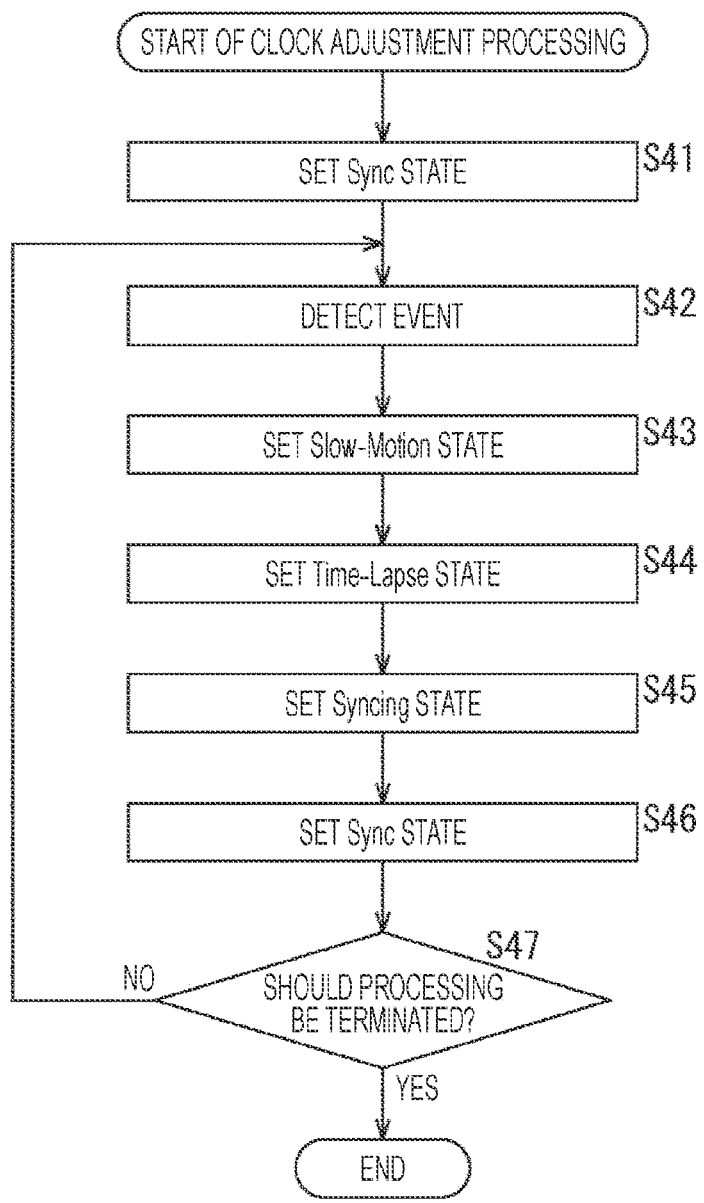
FIG. 6 is an explanatory flowchart of clock adjustment processing.

Furthermore, during the sound-field visualization processing, described with reference to FIG. 5, in the sound-field visualization system, clock adjustment processing is performed in the sound-field visualization device 11, in parallel with the sound-field visualization processing. The clock adjustment processing in the sound-field visualization device 11 will be described below with reference to the flowchart of FIG. 6.

In step S41, the clock adjustment unit 34 brings the state of the temporal axis to the Sync state and supplies the clock signal CLK1 and the clock signal CLK2 in synchronization at the same clock frequency to the sound-pressure distribution calculation unit 42 and the image processing unit 37, respectively.

In step S42, the event detection unit 33 detects an event on the basis of the audio signal, the temporal-frequency signal, or the harmonic coefficient supplied from the spatial-frequency domain transform unit 41, or a control signal supplied from the user control signal unit 31.

For example, the event detection unit 33 detects the event, on the basis of the audio signal or the temporal-frequency signal, with the detector designated by a control signal, or determines that the event has been detected, in response to supply of a control signal for an instruction as to the timing of detection of particular sound.

In response to detection of the event, the event detection unit 33 supplies a detection result indicating that the event has been detected, to the clock adjustment unit 34, and then the processing proceeds to step S43.

In step S43, when the detection result indicating that the event has been detected is supplied from the event detection unit 33, the clock adjustment unit 34 brings the state of the temporal axis to the Slow-Motion state.

Then, the clock adjustment unit 34 changes the clock frequency of the clock signal CLK1 to a clock frequency higher than that in the Sync state.

After that, for example, due to elapse of predetermined time after the detection of the event, when the event detection unit 33 supplies a detection result indicating that the event has terminated, to the clock adjustment unit 34, the processing proceeds to step S44.

In step S44, the clock adjustment unit 34 brings the state of the temporal axis to the Time-Lapse state, and changes the clock frequency of the clock signal CLK1 to a clock frequency lower than that in the Sync state.

Then, the clock adjustment unit 34 monitors the record status of the FIFO buffer 36, and performs the processing in step S45 at the timing of occurrence of buffer underrun in the FIFO buffer 36.

That is, in step S45, the clock adjustment unit 34 brings the state of the temporal axis to the Syncing state and changes the clock frequency of the clock signal CLK1, appropriately, such that the clock signal CLK1 and the clock signal CLK2 are in synchronization.

Then, in response to synchronization of the clock signal CLK1 and the clock signal CLK2, in step S46, the clock adjustment unit 34 brings the state of the temporal axis to the Sync state, and keeps the clock signal CLK1 and the clock signal CLK2 in synchronization.

In step S47, the clock adjustment unit 34 determines whether or not the processing should be terminated. For example, in a case where it is determined, in step S16 of FIG. 5, that the processing should be terminated, it is determined, in step S47, that the processing should be terminated.

In step S47, in a case where it is determined that the processing should not be terminated, the processing goes back to step S42, and then the processing described above is repeated.

In contrast to this, in step S47, in a case where it is determined that the processing should be terminated, each unit in the sound-field visualization device 11 stops the corresponding processing, so that the clock adjustment processing is terminated.

As above, the sound-field visualization device 11 adjusts (changes) the respective clock frequencies of the clock signal CLK1 and the clock signal CLK2, for example, in response to event detection.

In this manner, the user can observe the image for display in more detail, and the difference between calculation of the sound-pressure distribution information and display (rendering) of the image for display can be adjusted properly after termination of the event.

First Modification of First Embodiment

Exemplary Configuration of Sound-Field Visualization System

Note that, as illustrated in FIG. 1, the example in which the image for display is displayed on the display device 13 has been given above. However, the configuration of the sound-field visualization system that visualizes a sound field is not limited to the configuration illustrated in FIG. 1, and thus a different configuration may be provided.

Other exemplary configurations of the sound-field visualization system will be described below with reference to FIGS. 7 to 9. Note that parts in FIGS. 7 to 9 corresponding to those in FIG. 1 are denoted with the same reference signs, and thus the descriptions thereof will be appropriately omitted.

Figure 7:
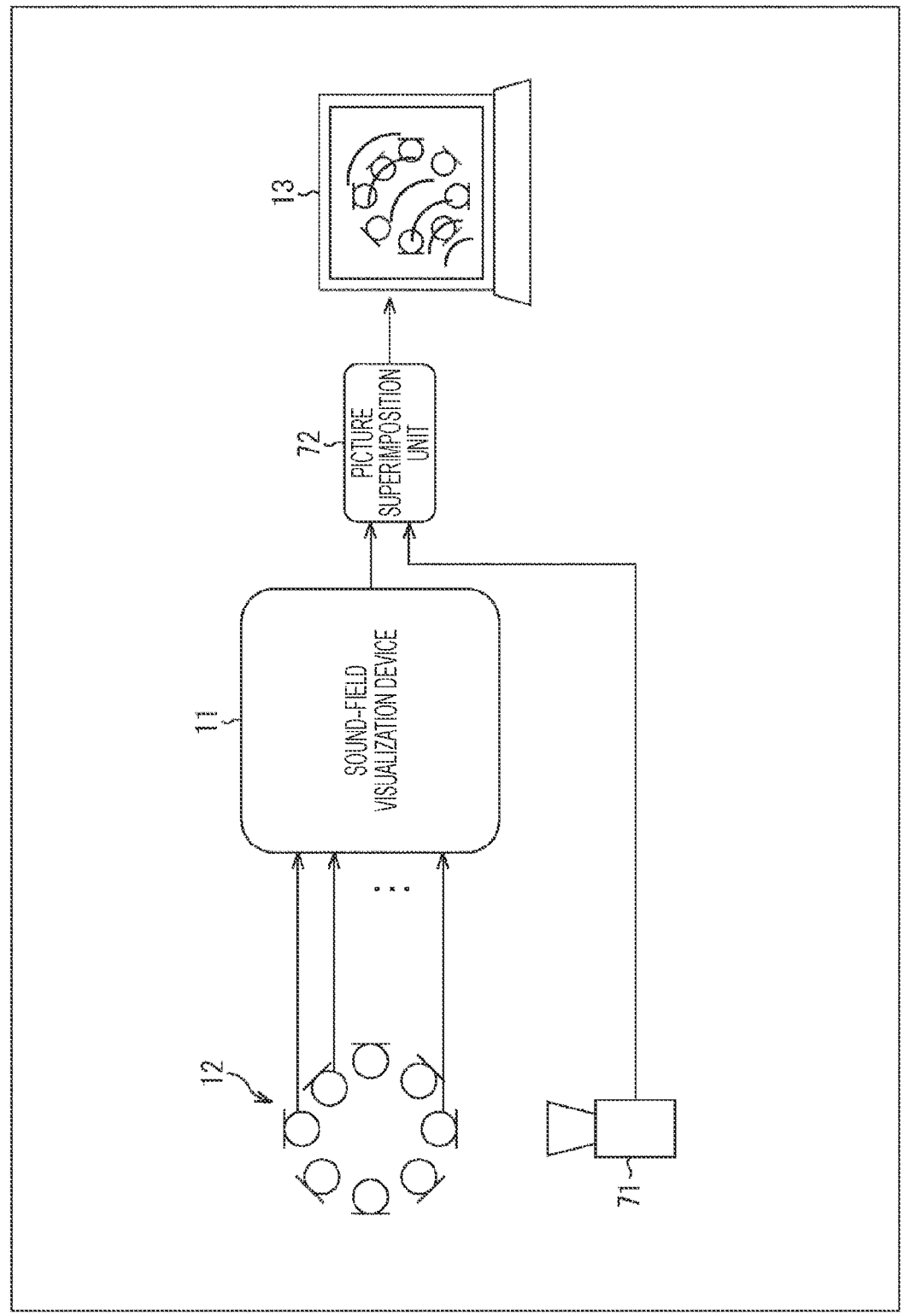
FIG. 7 illustrates an exemplary configuration of the sound-field visualization system.

In the example illustrated in FIG. 7, the sound-field visualization system includes a sound-field visualization device 11, a microphone array 12, a video camera 71, a picture superimposition unit 72, and a display device 13.

In the example, the video camera 71 shoots an image (picture) of the target space, and supplies its resultant shot image to the picture superimposition unit 72. Furthermore, the picture superimposition unit 72 is supplied with an image for display acquired by the sound-field visualization device 11 from the image processing unit 37.

The picture superimposition unit 72 superimposes the image for display supplied from the image processing unit 37, onto the shot image supplied from the video camera 71, and supplies the superimposed image as the final image for display to the display device 13, for display.

In the sound-field visualization system illustrated in FIG. 1, only the condition of wavefronts of sound in the target space is visually displayed on the display device 13.

In contrast to this, in the sound-field visualization system illustrated in FIG. 7, not only the condition of wavefronts of sound but also the condition of the target space is displayed on the display device 13.

Therefore, a user who observes the display device 13 can visually check the actual picture of the target space and the wavefronts of sound superimposed on the picture. Thus, the change of a sound field (distribution of sound pressure) occurring in real space can be observed more easily.

Furthermore, in this case, saving the shot image together with the audio signal or the harmonic coefficient as collection data enables change of the frequency or order as setting information after collection of the sound field and offline observation of the condition of wavefronts of sound and the condition of the target space, corresponding to the change.

Second Modification of First Embodiment

Exemplary Configuration of Sound-Field Visualization System

Figure 8:
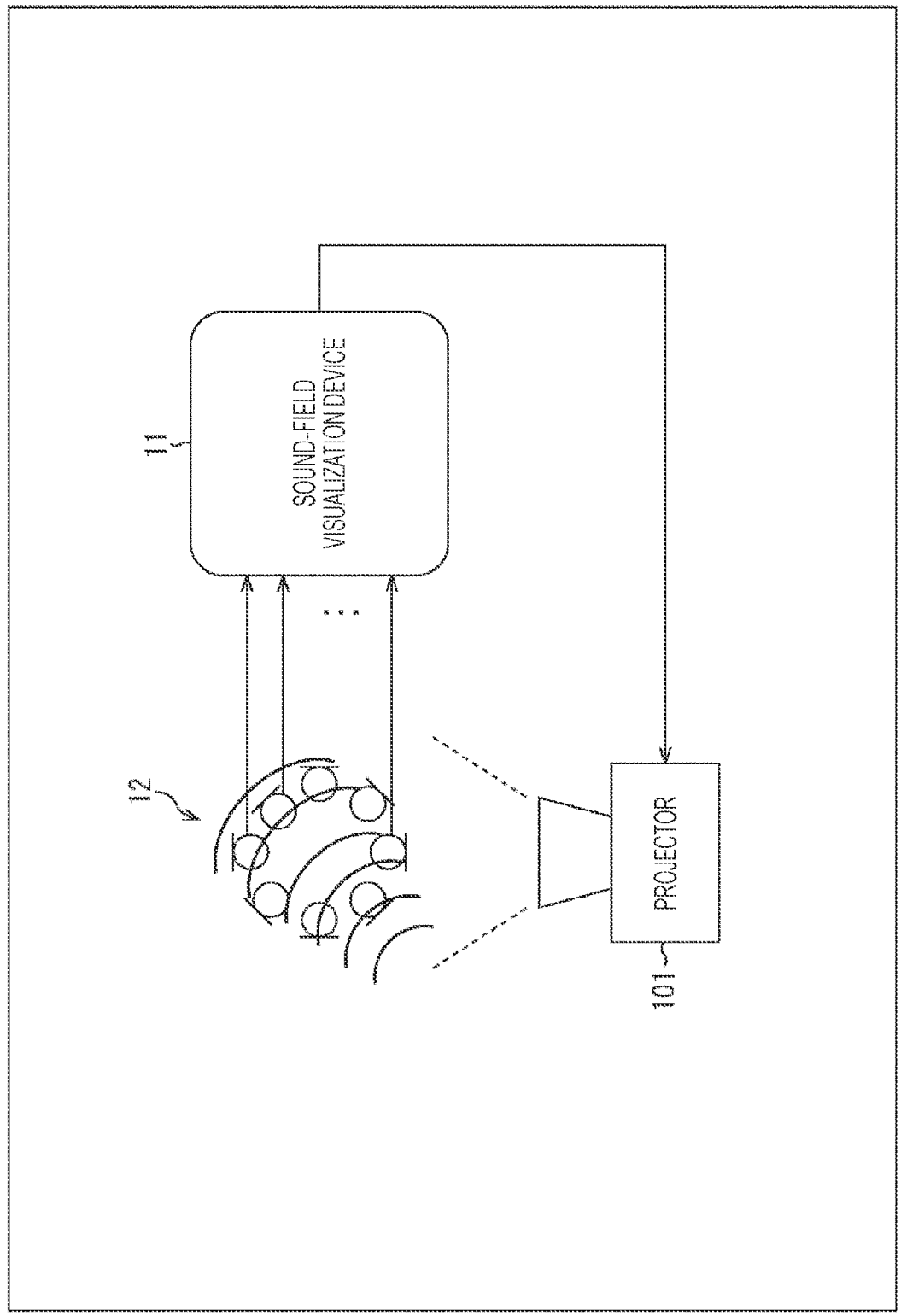
FIG. 8 illustrates an exemplary configuration of the sound-field visualization system.

Furthermore, for example, as illustrated in FIG. 8, an image for display including a sound field visualized may be projected in the target space in which a microphone array 12 is disposed.

In the example illustrated in FIG. 8, the sound-field visualization system includes a sound-field visualization device 11, the microphone array 12, and a projector 101.

In the example, an image for display acquired by the image processing unit 37 of the sound-field visualization device 11 is supplied from the image processing unit 37 to the projector 101.

On the basis of the image for display supplied from the image processing unit 37, the projector 101 projects light into the target space, so that the image for display indicating the condition of wavefronts of sound is displayed in superimposition on the actual target space.

As above, projecting the image for display into the actual target space enables easier observation of the change of a sound field (distribution of sound pressure) occurring in real space and easier grasping thereof. The sound-field visualization system illustrated in FIG. 8 is effective in operating amusements, such as games and attractions in theme parks.

Third Modification of First Embodiment

Exemplary Configuration of Sound-Field Visualization System

Figure 9:
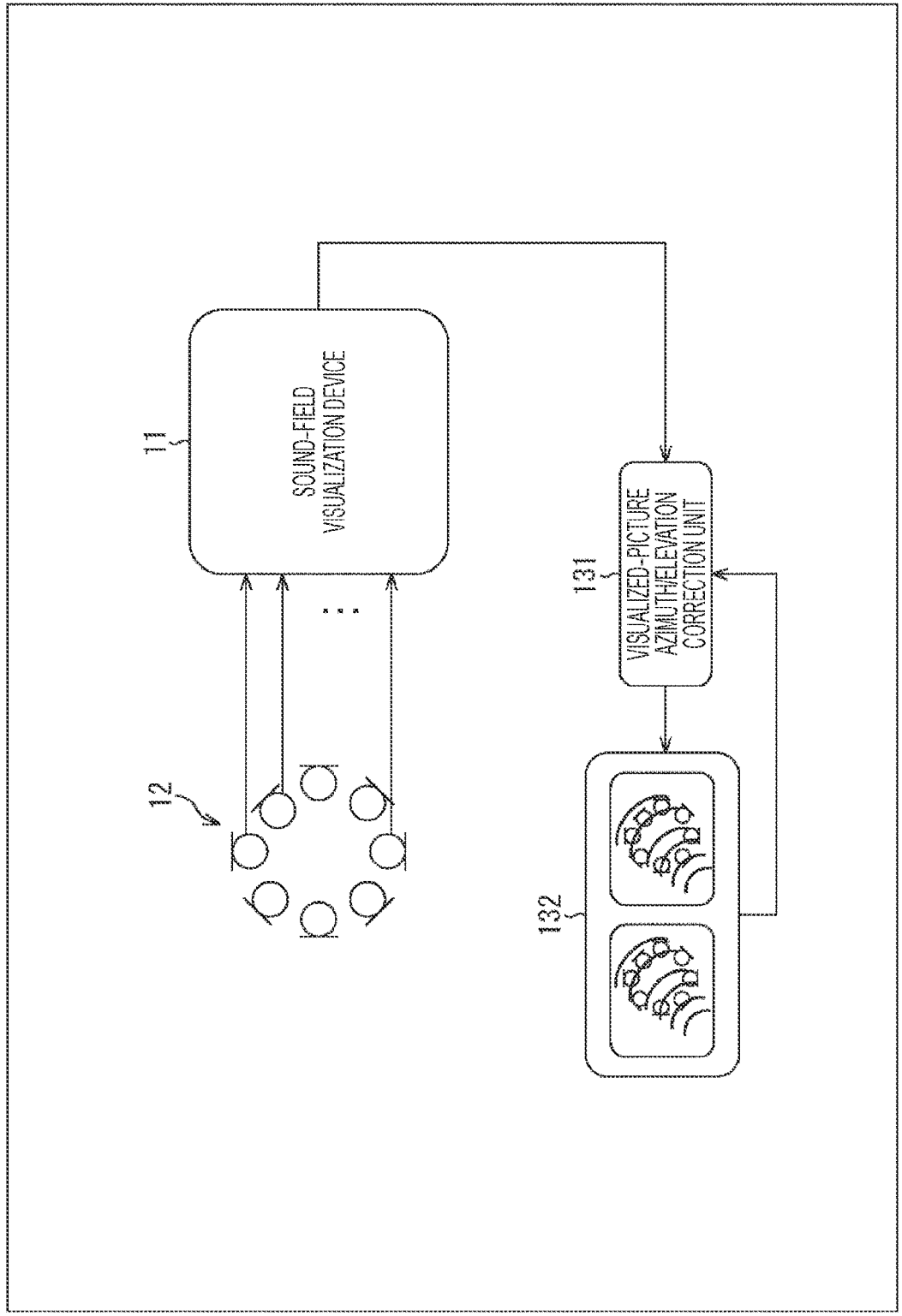
FIG. 9 illustrates an exemplary configuration of the sound-field visualization system.

Moreover, the present technology can be applied to AR or VR as illustrated in FIG. 9.

The sound-field visualization system illustrated in FIG. 9 includes a sound-field visualization device 11, a microphone array 12, a visualized-picture azimuth/elevation correction unit 131, and a goggle 132.

In the example, the microphone array 12 is disposed in the target space. Furthermore, a user who is wearing the goggle 132, as a wearable device for AR or VR, on the head is present in the target space.

In this case, an image for display acquired by the image processing unit 37 of the sound-field visualization device 11 is supplied to the visualized-picture azimuth/elevation correction unit 131. Furthermore, direction information indicating the direction in which the goggle 132 is oriented is supplied from the goggle 132 to the visualized-picture azimuth/elevation correction unit 131.

For example, the goggle 132 is provided with a gyroscope sensor or the like that measures the orientation of the goggle 132 and outputs a measurement result thereof as the direction information. The goggle 132 always supplies the direction information to the visualized-picture azimuth/elevation correction unit 131.

In accordance with the direction information supplied from the goggle 132, the visualized-picture azimuth/elevation correction unit 131 corrects the azimuth or elevation of the image for display supplied from the image processing unit 37, and supplies the corrected image for display to the goggle 132.

The goggle 132 displays the corrected image for display supplied from the visualized-picture azimuth/elevation correction unit 131, to present the wavefronts of sound in the target space to the user.

For example, in a case where the goggle 132 is designed for AR, the goggle 132 displays the corrected image for display on a translucent transmissive display unit, so that the wavefronts of sound in superimposition on the actual target space can be presented to the user.

Furthermore, for example, in a case where the goggle 132 is designed for VR, the goggle 132 displays the corrected image for display in superimposition on a shot image of the target space shot by a camera that the goggle 132 has, so that the wavefronts of sound in superimposition on the target space can be presented to the user.

In this manner, in response to the orientation of the head of the user, the wavefronts of sound (distribution of sound pressure) viewed from the viewpoint of the user can be presented.

Exemplary Configuration of Computer

Here, the pieces of processing in series described above can be performed by hardware or can be performed by software. In a case where the pieces of processing in series are performed by software, a program included in the software is installed onto a computer. Here, examples of the computer include a computer built in dedicated hardware and a general-purpose personal computer capable of performing various types of functions due to installation of various types of programs.

Figure 10:
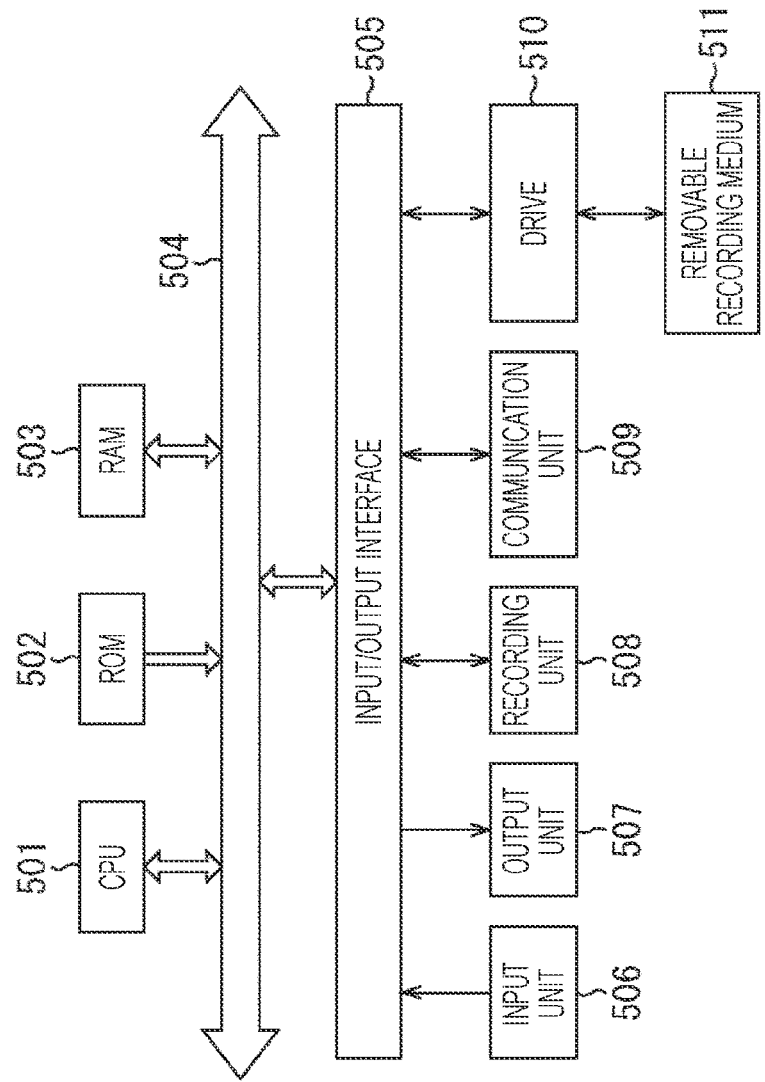
FIG. 10 illustrates an exemplary configuration of a computer.

FIG. 10 is a block diagram of an exemplary hardware configuration of a computer that performs, due to a program, the pieces of processing in series described above.

In the computer, a central processing unit (CPU) 501, a read only memory (ROM) 502, and a random access memory (RAM) 503 are mutually connected through a bus 504.

Moreover, an input/output interface 505 is connected to the bus 504. An input unit 506, an output unit 507, a recording unit 508, a communication unit 509, and a drive 510 are connected to the input/output interface 505.

The input unit 506 includes, for example, a keyboard, a mouse, a microphone, and an image capturing element. The output unit 507 includes, for example, a display and a speaker. The recording unit 508 includes, for example, a hard disk and a nonvolatile memory. The communication unit 509 includes, for example, a network interface. The drive 510 drives a removable recording medium 511, such as a magnetic disk, an optical disc, a magneto-optical disc, or a semiconductor memory.

In the computer having the above configuration, for example, the CPU 501 loads the program recorded in the recording unit 508 into the RAM 503 through the input/output interface 505 and the bus 504 and executes the program, so that the pieces of processing in series described above are performed.

The program that the computer (CPU 501) executes can be recorded in the removable recording medium 511 serving, for example, as a packaged medium, for provision. Furthermore, the program can be provided through a wired transmission medium or a wireless transmission medium, such as a local area network, the Internet, or digital satellite broadcasting.

In the computer, the removable recording medium 511 is put into the drive 510, so that the program can be installed onto the recording unit 508 through the input/output interface 505. Furthermore, the program is received by the communication unit 509 through a wired transmission medium or a wireless transmission medium, so that the program can be installed onto the recording unit 508. Alternatively, the program can be installed in advance onto the ROM 502 or the recording unit 508.

Note that the program that the computer executes may be a program for performing processing on a time series basis in the order described in the present specification, or may be a program for performing processing in parallel or with necessary timing, such as the timing of calling.

Furthermore, embodiments of the present technology are not limited to the embodiment described above, and thus various alterations can be made without departing from the scope of the spirit of the present technology.

For example, the present technology can have a configuration of cloud computing in which a plurality of devices dividedly processes one function in cooperation through a network.

Furthermore, each step in each flowchart described above can be performed by one device or can be dividedly performed by a plurality of devices.

Moreover, in a case where one step includes a plurality of pieces of processing, the plurality of pieces of processing included in the one step can be performed by one device or can be dividedly performed by a plurality of devices.

Moreover, the present technology can have the following configurations.

(1)

An information processing device including:

a calculation unit configured to calculate, on the basis of positional information indicating a plurality of observation positions in a space and an audio signal of sound observed at each of the plurality of observation positions, an amplitude or phase of the sound at each of a plurality of positions in the space at a first time interval;

an event detection unit configured to detect an event; and an adjustment unit configured to perform, in a case where the event is detected, control such that the amplitude or the phase is calculated at a second time interval shorter than the first time interval.

(2)

The information processing device according to (1), in which the calculation unit transforms the audio signal at each of the plurality of observation positions into a spatial-frequency domain signal on the basis of the positional information and calculates the amplitude or the phase on the basis of the spatial-frequency domain signal.

(3)

The information processing device according to (1) or (2), in which the adjustment unit performs, in a case where the event is terminated, control such that the amplitude or the phase is calculated at a third time interval longer than the first time interval.

(4)

The information processing device according to (3), further including:

a buffer configured to retain the amplitude or the phase calculated, in which the adjustment unit performs, in a case where underflow of the amplitude or underflow of the phase occurs in the buffer during calculation of the amplitude or the phase at the third time interval, control such that the amplitude or the phase is calculated at a fourth time interval that is longer than the second time interval and is shorter than the first time interval.

(5)

The information processing device according to any one of (1) to (4), in which the event detection unit determines, in response to an instruction from a user, that the event has been detected.

(6)

The information processing device according to any one of (1) to (4), in which the event detection unit determines, in a case where a predetermined classification of sound is detected, that the event has been detected.

(7)

The information processing device according to (6), in which the predetermined classification of sound has a signal level in a predetermined level range.

(8)

The information processing device according to (6), in which the predetermined classification of sound has a particular frequency at a level in a predetermined level range.

(9)

The information processing device according to (6), in which the predetermined classification of sound has a predetermined spectral shape.

(10)

The information processing device according to any one of (1) to (4), in which the event detection unit determines, at a predetermined timing, that the event has been detected.

(11)

The information processing device according to any one of (1) to (10), further including:

an image processing unit configured to generate an image of wavefronts of the sound in the space on the basis of the amplitude or the phase calculated.

(12)

The information processing device according to (11), in which the adjustment unit performs, in a case where the amplitude or the phase is calculated at the second time interval, control such that a display of the image is updated at a time interval longer than the second time interval.

(13)

An information processing method to be performed by an information processing device, the information processing method including:

calculating, on the basis of positional information indicating a plurality of observation positions in a space and an audio signal of sound observed at each of the plurality of observation positions, an amplitude or phase of the sound at each of a plurality of positions in the space at a first time interval;

detecting an event; and performing, in a case where the event is detected, control such that the amplitude or the phase is calculated at a second time interval shorter than the first time interval.

(14)

A program for causing a computer to perform processing including:

calculating, on the basis of positional information indicating a plurality of observation positions in a space and an audio signal of sound observed at each of the plurality of observation positions, an amplitude or phase of the sound at each of a plurality of positions in the space at a first time interval;

detecting an event; and performing, in a case where the event is detected, control such that the amplitude or the phase is calculated at a second time interval shorter than the first time interval.

REFERENCE SIGNS LIST

11 Sound-field visualization device
12 Microphone array
13 Display device
22 Temporal-axis mapping unit
23 Rendering unit
33 Event detection unit
34 Clock adjustment unit
35 Calculation unit
36 FIFO buffer
37 Image processing unit
41 Spatial-frequency domain transform unit
42 Sound-pressure distribution calculation unit

The invention claimed is:

1. An information processing device, comprising:
a calculation unit configured to calculate, based on positional information indicating a plurality of observation positions in a space and an audio signal of sound observed at each of the plurality of observation positions, an amplitude or phase of the sound at each of a plurality of positions in the space at a first time interval;
an event detection unit configured to detect an event; and
an adjustment unit configured to perform, based on the detection of the event is detected, control such that the amplitude or the phase is calculated at a second time interval shorter than the first time interval.

2. The information processing device according to claim 1, wherein the calculation unit is further configured to transform the audio signal at each of the plurality of observation positions into a spatial-frequency domain signal based on the positional information and calculate the amplitude or the phase based on the spatial-frequency domain signal.

3. The information processing device according to claim 1, wherein the adjustment unit is further configured to perform, based on a termination of the event, control such that the amplitude or the phase is calculated at a third time interval longer than the first time interval.

4. The information processing device according to claim 3, further comprising:
a buffer configured to retain the amplitude or the phase calculated, wherein the adjustment unit is further configured to perform, based on occurrence of underflow of the amplitude or underflow of the phase in the buffer during calculation of the amplitude or the phase at the third time interval, control such that the amplitude or the phase is calculated at a fourth time interval that is longer than the second time interval and is shorter than the first time interval.

5. The information processing device according to claim 1, wherein the event detection unit is further configured to determine, in response to an instruction from a user, that the event has been detected.

6. The information processing device according to claim 1, wherein the event detection unit is further configured to determine, based on detection of a specific classification of sound, that the event has been detected.

7. The information processing device according to claim 6, wherein the specific classification of sound has a signal level in a specific level range.

8. The information processing device according to claim 6, wherein the specific classification of sound has a particular frequency at a level in a specific level range.

9. The information processing device according to claim 6, wherein the specific classification of sound has a specific spectral shape.

10. The information processing device according to claim 1, wherein the event detection unit is further configured to determine, at a specific timing, that the event has been detected.

11. The information processing device according to claim 1, further comprising:
an image processing unit configured to generate an image of wavefronts of the sound in the space based on the amplitude or the phase calculated.

12. The information processing device according to claim 11, wherein the adjustment unit is further configured to perform, based on calculation of the amplitude or the phase at the second time interval, control such that a display of the image is updated at a time interval longer than the second time interval.

13. An information processing method, comprising:
in an information processing device:
- calculating, based on positional information indicating a plurality of observation positions in a space and an audio signal of sound observed at each of the plurality of observation positions, an amplitude or phase of the sound at each of a plurality of positions in the space at a first time interval;
- detecting an event; and
- performing, based on the detection of the event, control such that the amplitude or the phase is calculated at a second time interval shorter than the first time interval.

14. A non-transitory computer-readable medium having stored thereon, computer-executable instructions which, when executed by a computer, cause the computer to execute operations, the operations comprising:
- calculating, based on positional information indicating a plurality of observation positions in a space and an audio signal of sound observed at each of the plurality of observation positions, an amplitude or phase of the sound at each of a plurality of positions in the space at a first time interval;
- detecting an event; and
- performing, based on the detection of the event, control such that the amplitude or the phase is calculated at a second time interval shorter than the first time interval.

\* \* \* \* \*